US011386655B2

(12) United States Patent
Metaxas et al.

(10) Patent No.: US 11,386,655 B2
(45) Date of Patent: Jul. 12, 2022

(54) IMAGE PROCESSING NEURAL NETWORK SYSTEMS AND METHODS WITH SCENE UNDERSTANDING

(71) Applicant: Rutgers, The State University of New Jersey, New Brunswick, NJ (US)

(72) Inventors: Dimitris Metaxas, New Brunswick, NJ (US); Zachary A. Daniels, New Brunswick, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 224 days.

(21) Appl. No.: 16/790,641

(22) Filed: Feb. 13, 2020

(65) Prior Publication Data
US 2021/0357648 A1   Nov. 18, 2021

Related U.S. Application Data

(60) Provisional application No. 62/806,459, filed on Feb. 15, 2019.

(51) Int. Cl.
G06V 20/40    (2022.01)
G06F 17/15    (2006.01)
G06K 9/62     (2022.01)
G06N 3/04     (2006.01)
G06F 17/16    (2006.01)

(52) U.S. Cl.
CPC .............. *G06V 20/41* (2022.01); *G06F 17/15* (2013.01); *G06F 17/16* (2013.01); *G06K 9/6267* (2013.01); *G06N 3/04* (2013.01)

(58) Field of Classification Search
CPC combination set(s) only.
See application file for complete search history.

(56) References Cited

U.S. PATENT DOCUMENTS

| 8,712,939 | B2 | 4/2014 | Szatmary et al. | |
|---|---|---|---|---|
| 2017/0206431 | A1 | 7/2017 | Sun et al. | |
| 2019/0005330 | A1* | 1/2019 | Uhlenbrock | G06V 10/82 |
| 2019/0042867 | A1* | 2/2019 | Chen | H04N 19/80 |
| 2019/0050681 | A1* | 2/2019 | Tate | G06T 7/60 |
| 2019/0065895 | A1* | 2/2019 | Wang | G06V 40/161 |
| 2019/0188524 | A1* | 6/2019 | He | G06K 9/6255 |
| 2019/0228266 | A1* | 7/2019 | Habibian | G06N 3/0445 |

OTHER PUBLICATIONS

Bolei Zhou,"Places: An Image Database for Deep Scene Understanding",Jun. 10, 2016, Computer Vision and Pattern Recognition, https://arxiv.org/abs/1610.02055, pp. 1-10.*

(Continued)

*Primary Examiner* — Omar S Ismail
(74) *Attorney, Agent, or Firm* — Talem IP Law, LLP

(57) ABSTRACT

An image processing neural network system includes a base net of at least one convolutional layer and at least one pooling layer; and a scenario block layer. The scenario block layer performs scene classification and generates a dictionary of scenarios and a vector of scenario encoding coefficients to output a probabilistic scene class assignment and the vector of scenario encoding coefficients. The vector of scenario encoding coefficients corresponds to reasoning for the scene classification.

20 Claims, 14 Drawing Sheets

(56) References Cited

OTHER PUBLICATIONS

Tian Lan, "From Subcategories to Visual Composites: A Multi-Level Framework for Object Detection," Dec. 2013,Proceedings of the IEEE International Conference on Computer Vision (ICCV), 2013, pp. 369-375.*

Tam V. Nguyen, "Exploiting Generic Multi-Level Convolutional Neural Networks for Scene Understanding," Feb. 2, 2017, 2016 14th International Conference on Control, Automation, Robotics & Vision Phuket, Thailand, Nov. 13-15, 2016 (ICARCV 2016),pp. 1-5.*

Fan Hu, "Transferring Deep Convolutional Neural Networks for the Scene Classification of High-Resolution Remote Sensing Imagery," Nov. 5, 2015,Remote Sens. 2015, 7, 14680-14707; doi: 10.3390/rs71114680,pp. 14680-14683,14700-14703.*

Rao Muhammad Anwer, "Binary patterns encoded convolutional neural networks for texture recognition and remote sensing scene classification," Feb. 15, 2018,ISPRS Journal of Photogrammetry and Remote Sensing 138 (2018),pp. 74-82.*

Linan Feng et al., "Utilizing Co-occurrence Patterns for Semantic Concept Detection in Images", 21st International Conference on Pattern Recognition (ICPR 2012), Nov. 11-15, 2012, 4 pages.

Tian Lan et al., "From Subcategories to Visual Composites: A Multi-Level Framework for Object Detection", Proceedings of the 2013 IEEE International Conference on Computer Vision, Dec. 2013, 8 pages.

Linan Feng et al., "Semantic Concept Co-Occurrence Patterns for Image Annotation and Retrieval", IEEE Transactions an Pattern Analysis and Machine Intelligence, Apr. 2016, 15 pages, vol. 38, No. 4.

* cited by examiner

Query: How are the Images Similar?
Result:
- Both images are "park" scenes.
- They share the following scenarios: (person) and (grass, path, earth, tree)

Query: How do the Images Differ?
Result:
- Image 1 contains the scenario (head, arms, legs, bag)
- Image 2 contains the scenario (building, lamp, road, sidewalk, window)

IMAGE PROCESSING NEURAL NETWORK SYSTEMS AND METHODS WITH SCENE UNDERSTANDING

CROSS REFERENCE TO RELATED APPLICATION

This application claims the benefit of U.S. Provisional Patent Application No. 62/806,459, filed Feb. 15, 2019.

GOVERNMENT SUPPORT

This invention was made with government support under Grant No. DGE-1433187 awarded by the National Science Foundation (NSF) and Grant No. FA9550-15-1-0054 awarded by the Air Force Office of Scientific Research (AFOSR) under the Dynamic Data-Driven Application Systems (DDDAS) program. The Government has certain rights in the invention.

BACKGROUND

The ability for computational agents to reason about the high-level content of real-world scene images is important for many applications. For example, for many applications (e.g. robotics, human-machine teaming, surveillance, and autonomous vehicles), an agent must reason about the high-level content of real-world scene images in order to make rational, grounded decisions that can be trusted by humans. It is often also necessary to have models that are able to be interpreted by humans in order to further encourage trust and allow humans to understand the failure modes of the autonomous agent. For example, if a self-driving car makes an error, it is important to know what caused the error to prevent future situations where similar errors might arise.

BRIEF SUMMARY

Image processing neural network systems and methods with scene understanding are provided. The described systems and methods can recognize scenes (e.g., in images and videos) as well as explain the reasons for the recognition in a human-understandable form. The described systems are applicable to areas including, but not limited to, human-machine teaming, robotics, medical image diagnostics, surveillance, and autonomous vehicles. The described techniques can be used to explain decisions and actions made by artificial intelligence (AI) processes. Advantageously, the described systems and methods can support safety-critical tasks and tasks involving human-machine teaming.

A scene includes one or more scenarios. A scenario includes one or more objects. A same object can appear in multiple scenarios. In some cases, the one or more objects forming a scenario are a set of frequently co-occurring objects. In some cases, the one or more objects forming a scenario may be a set of objects identified based on affordances (e.g., perceived and actual properties of the thing, generally with respect to its use). In some cases, the one or more objects forming a scenario may be a set of objects identified based on interactions (e.g., with each other or another object). In some cases, the one or more objects forming a scenario may be a set of objects identified based on spatial relationships. In some cases, the one or more objects forming a scenario may be a set of objects identified based on temporal relationships (e.g., order, versions). In some cases, the one or more objects forming a scenario may be a set of objects identified based on causal relationships (e.g., occurrence of object causes occurrence of another object). In some cases, a scenario can be formed by a combination of relationships.

The dictionary of scenarios indicates a set of objects for each scenario. In some cases, the dictionary of scenarios can include scenarios formed of one or more objects grouped according to any one, a subset, or all of the described relationships for grouping of objects.

An image processing neural network system can include at least one convolutional layer; at least one pooling layer; and a scenario block layer that performs scene classification and generates a dictionary of scenarios and a vector of scenario encoding coefficients to output a probabilistic scene class assignment and the vector of scenario encoding coefficients. The vector of scenario encoding coefficients corresponds to reasoning for the scene classification. An application using the described system can interpret the output of the vector of scenario encoding coefficients using the dictionary; and present the information in any suitable manner. In some cases, the described system can be implemented in an autonomous vehicle or a robot. In a further implementation, the dictionary of scenarios and any models used for the scenario block layer can be updated based on new data resulting from a newly encountered scene during use of the image processing neural network system.

A method of image classification with scene understanding, can include receiving an image at an image processing neural network system, processing the image using the image processing neural network system to determine a scene assignment and a confidence score for the scene assignment and generate a dictionary of scenarios and a vector of scenario encoding coefficients; identifying scenarios associated with the scene assignment using the vector of scenario encoding coefficients for the image and the dictionary of scenarios; and outputting the scene assignment and the confidence score with scenarios identified from the vector of scenario encoding coefficients.

In one implementation, when the confidence score does not satisfy a criterion for sufficient confidence for predicting the scene assignment, the method can further include determining whether a scene of the image is a new unseen type of scene, and if it is determined that the scene is a new unseen type of scene, the method can include querying a human to collect new data and update a model used by the image processing neural network system. When the image received at the image processing neural network system is from a sensor of an autonomous vehicle or robot and if it is not determined that the scene is a new unseen type of scene, the method can further include sending a signal to capture a new image from a different view (e.g., using the sensor) for processing by the image processing neural network system.

In some cases, the image processing neural network system can further include a topic modeling layer or other extension. Such extensions can be used to add further content and scene understanding in a variety of applications, including, but not limited to, chest x-ray analysis.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Image processing neural network systems and methods with scene understanding are provided. The described systems and methods can recognize scenes (e.g., in images and videos) as well as explain the reasons for the recognition in a human-understandable form. The described systems are applicable to areas including, but not limited to, human-machine teaming, robotics, medical image diagnostics, surveillance, and autonomous vehicles. The described techniques can be used to explain decisions and actions made by artificial intelligence (AI) processes. Advantageously, the described systems and methods can support safety-critical tasks and tasks involving human-machine teaming.

Figure 1A:
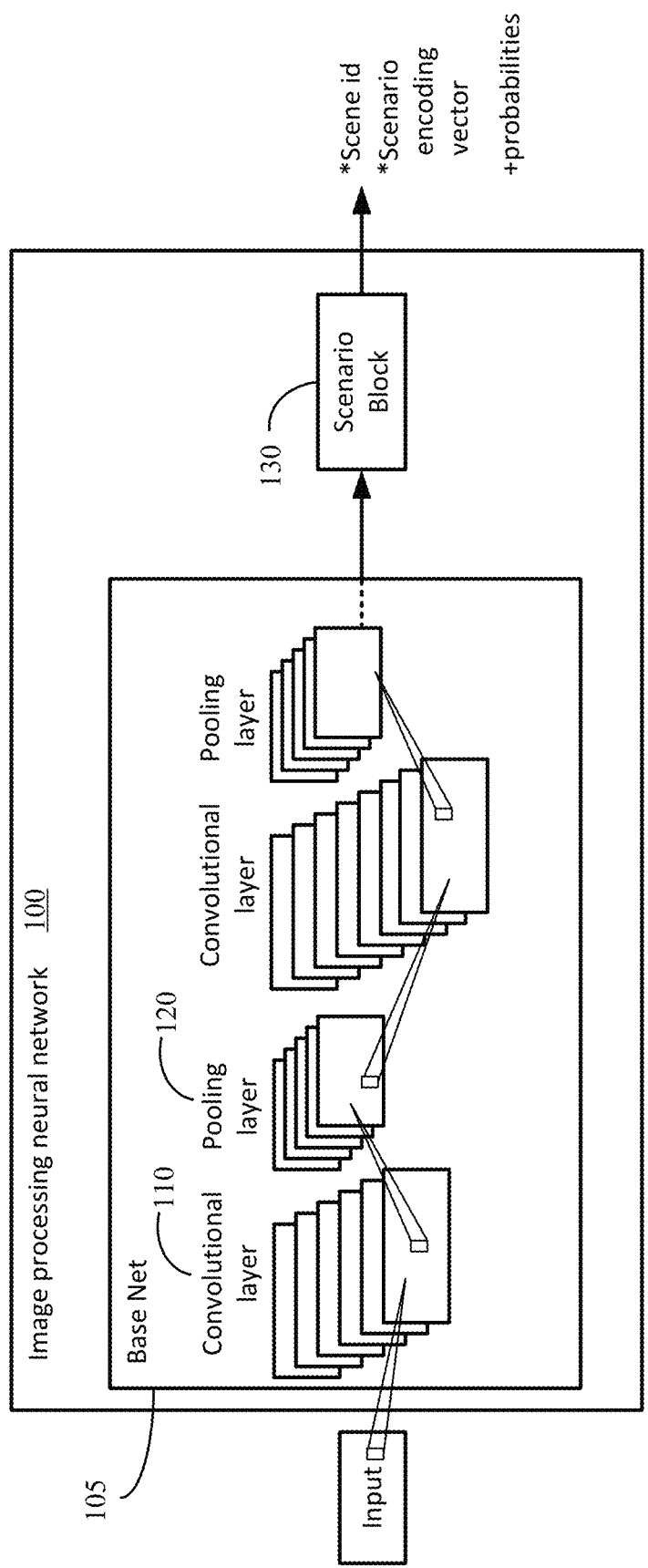
FIG. 1A illustrates a configuration of an image processing neural network.
Figure 1B:
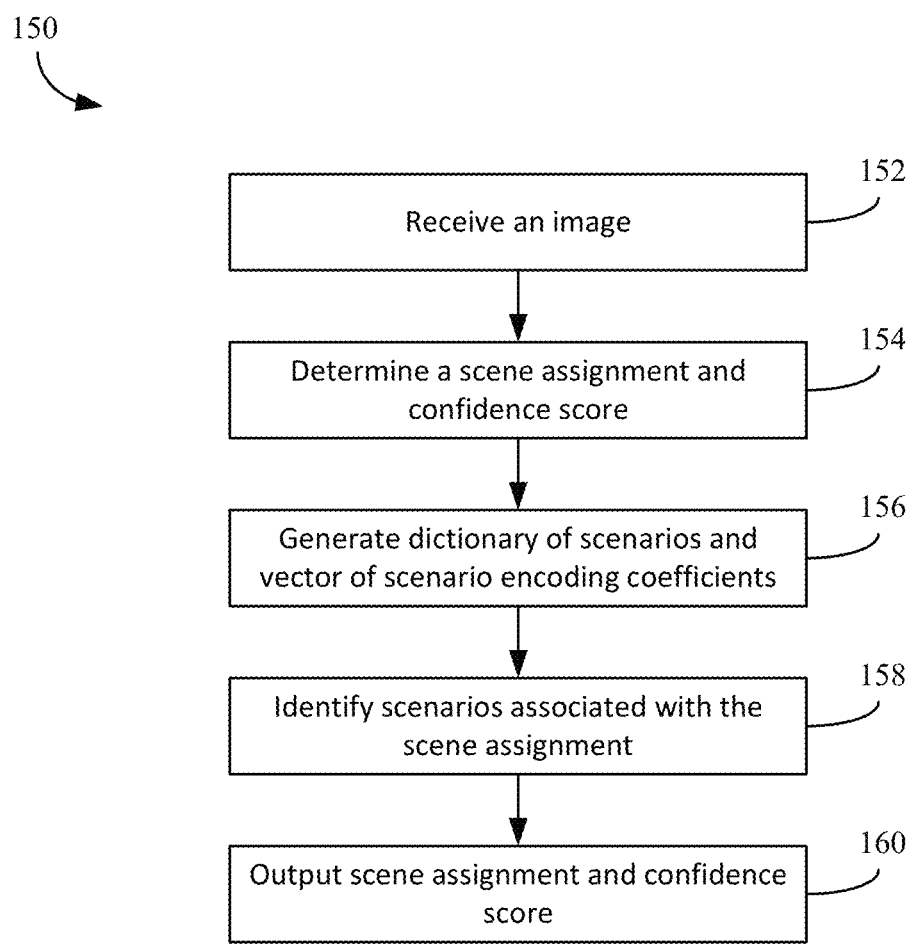
FIG. 1B illustrates an example method of image classification with scene understanding.

FIG. 1A illustrates a configuration of an image processing neural network; and FIG. 1B illustrates an example method of image classification with scene understanding. The image processing neural network can be based on a convolutional neural network (CNN) where the final convolutional layers are replaced with a scenario block. Accordingly, as illustrated in FIG. 1A, an image processing neural network system 100 can include a base net 105 of at least one convolutional layer 110 and at least one pooling layer 120; and a scenario block 130.

During training, the network only requires certain information about the objects in an image. The certain information depends on the type of relationship between objects used to construct the scenario. For example, scenarios based on co-occurrence statistics require information about presence of objects in the image. This information may be available by labels found in tags or other metadata for the image. The labels may be initially assigned by humans, but may be automatically generated prior to training or even applied during testing (where the post-testing-applied labels are used to support ongoing training). During testing (and use), the system can receive input of only images (e.g., not requiring tags or other labels identifying the objects).

The scenario block 130 includes at least one layer. The scenario block 130 performs scene classification; and generates a dictionary of scenarios and a vector of scenario encoding coefficients to output a probabilistic scene class assignment (e.g., scene id+probability) and the vector of scenario encoding coefficients when an image is received as input. The vector of scenario encoding coefficients corresponds to reasoning for the scene classification. An application or agent using the described system can interpret the output of the vector of scenario encoding coefficients using the dictionary; and present the information in any suitable manner.

A scene includes one or more scenarios. A scenario includes one or more objects. A same object can appear in multiple scenarios. In some cases, the one or more objects forming a scenario are a set of frequently co-occurring objects. In some cases, the one or more objects forming a scenario may be a set of objects identified based on affordances. In some cases, the one or more objects forming a scenario may be a set of objects identified based on interactions. In some cases, the one or more objects forming a scenario may be a set of objects identified based on temporal relationships. In some cases, the one or more objects forming a scenario may be a set of objects identified based on causal relationships. In some cases, a scenario can be formed by a combination of relationships.

The dictionary of scenarios indicates a set of objects for each scenario. In some cases, the dictionary of scenarios can include scenarios formed of one or more objects grouped according to any one, subset, or all of the described relationships for grouping objects.

Explainable machine learning models rely on two properties: 1) features should be low-dimensional and human-interpretable and 2) models should be simple (with few parameters), easy for humans to inspect, and operate in a principled, well-understood way. A low-dimensional, semantically-grounded, object-based representation for scene understanding called the "scenario" addresses the first property. Scenarios—which are part of the scenario block—can be used to make convolutional neural networks (CNNs) more transparent, thus addressing the second property.

"Scenarios" provide an interpretable, data-driven representation for scene understanding. As mentioned above, scenarios may be based on sets of frequently co-occurring objects, a set of objects identified based on affordances, a set of objects identified based on interactions, a set of objects identified based on spatial relationships, a set of objects identified based on temporal relationships a set of objects identified based on causal relationships, or a combination thereof. In some cases, to support the use of temporal relationships, the neural network is modified to support a sequence of frames, for example, by using a recurrent or 3D convolutional DNN (deep neural network) and extending the matrix factorization (e.g., as described in more detail below) to a tensor factorization-based approach.

In general, scenarios satisfy the following properties: 1) Scenarios are composed of one or more objects. 2) The same object can appear in multiple scenarios, and this should reflect the context in which the object appears, e.g. {keyboard, screen, mouse} and {remote control, screen, cable box} both contain the "screen" object, but in the first scenario, the screen is a computer monitor, and in the second scenario, it is a television screen. 3) Scenes can be decomposed as combinations of scenarios, e.g. a bathroom scene instance might decompose into: {shower, bathtub, shampoo}+{mirror, sink, toothbrush, toothpaste}+{toilet, toilet paper}. 4) Scenarios are flexible and robust to missing objects. A scenario can be present in a scene without all of its constituent objects being present.

The described image processing neural network system 100 is computationally efficient (see e.g., results of example implementation in section entitled "Results of Tests") and is human-interpretable because system 100 produces explanations when making decisions. For example, for scene classification, predicted scenarios are used as low-dimensional, interpretable features; humans can verify the presence of each predicted scenario in an image by examining the scenario-localizing attention maps produced by the network; and humans can inspect how much influence each scenario exerts when assigning a class. Advantageously, through use of the described framework (and "scenarios"), it is possible to understand how a network arrives at specific decisions.

Referring to FIG. 1B, a method (150) of image classification with scene understanding, which can be performed using system 100, can include receiving (152) an image at the image processing neural network system 100, processing the image using the image processing neural network system 100 to determine (154) a scene assignment and a confidence score for the scene assignment and generate (156) a dictionary of scenarios and a vector of scenario encoding coefficients; identifying (158) scenarios associated with the scene assignment using the vector of scenario encoding coefficients for the image and the dictionary of scenarios; and outputting (160) the scene assignment and the confidence score with scenarios identified from the vector of scenario encoding coefficients.

Figure 5:
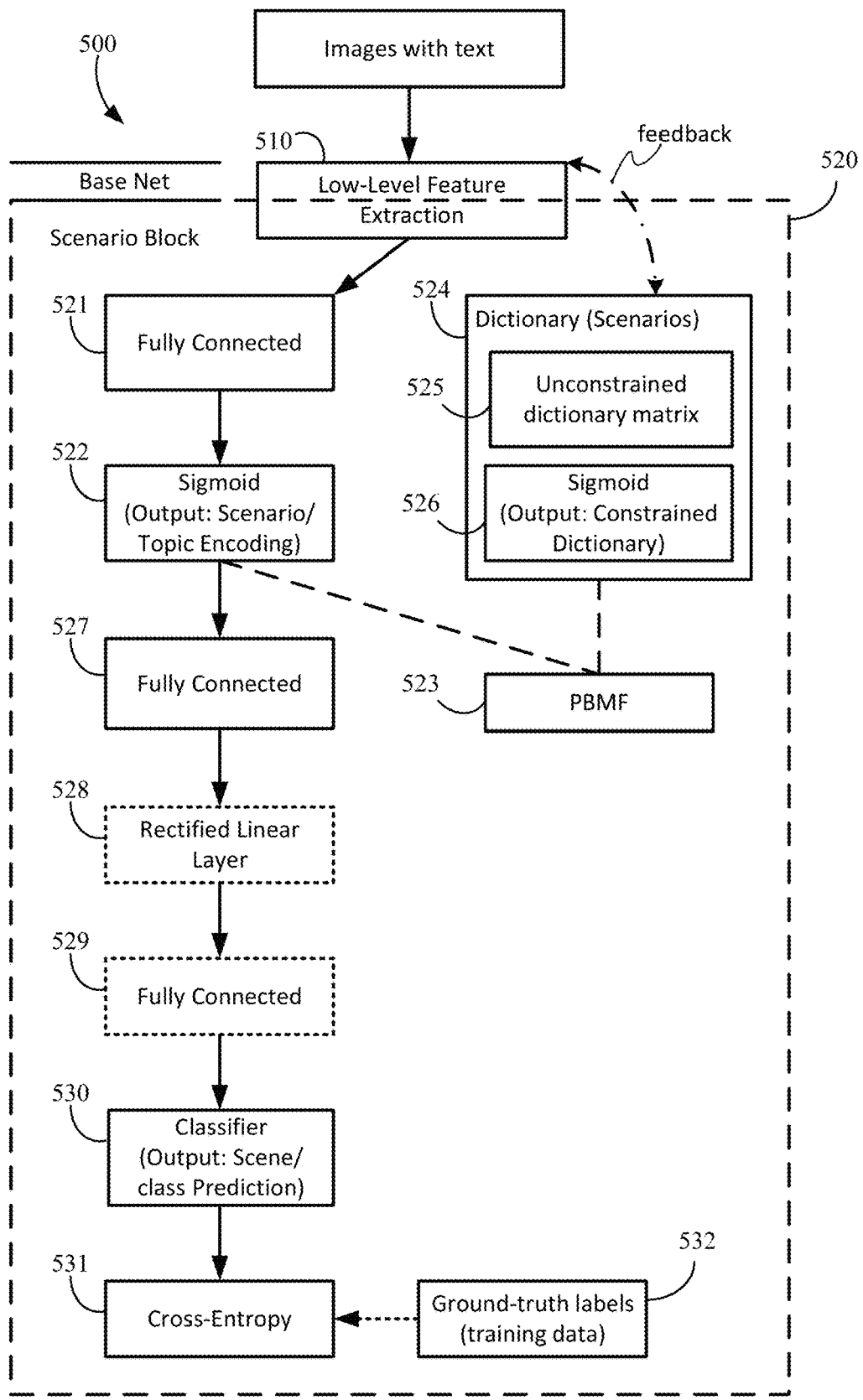
FIG. 5 illustrates a detailed view of an example image processing neural network with extension.

In some cases, the image processing neural network system 100 can further include a topic modeling layer or other extension, such as described in more detail with respect to the example shown in FIG. 5. Such extensions can be used to add further content and scene understanding in a variety of applications, including, but not limited to, medical imaging analysis such as chest x-ray analysis.

Figure 2:
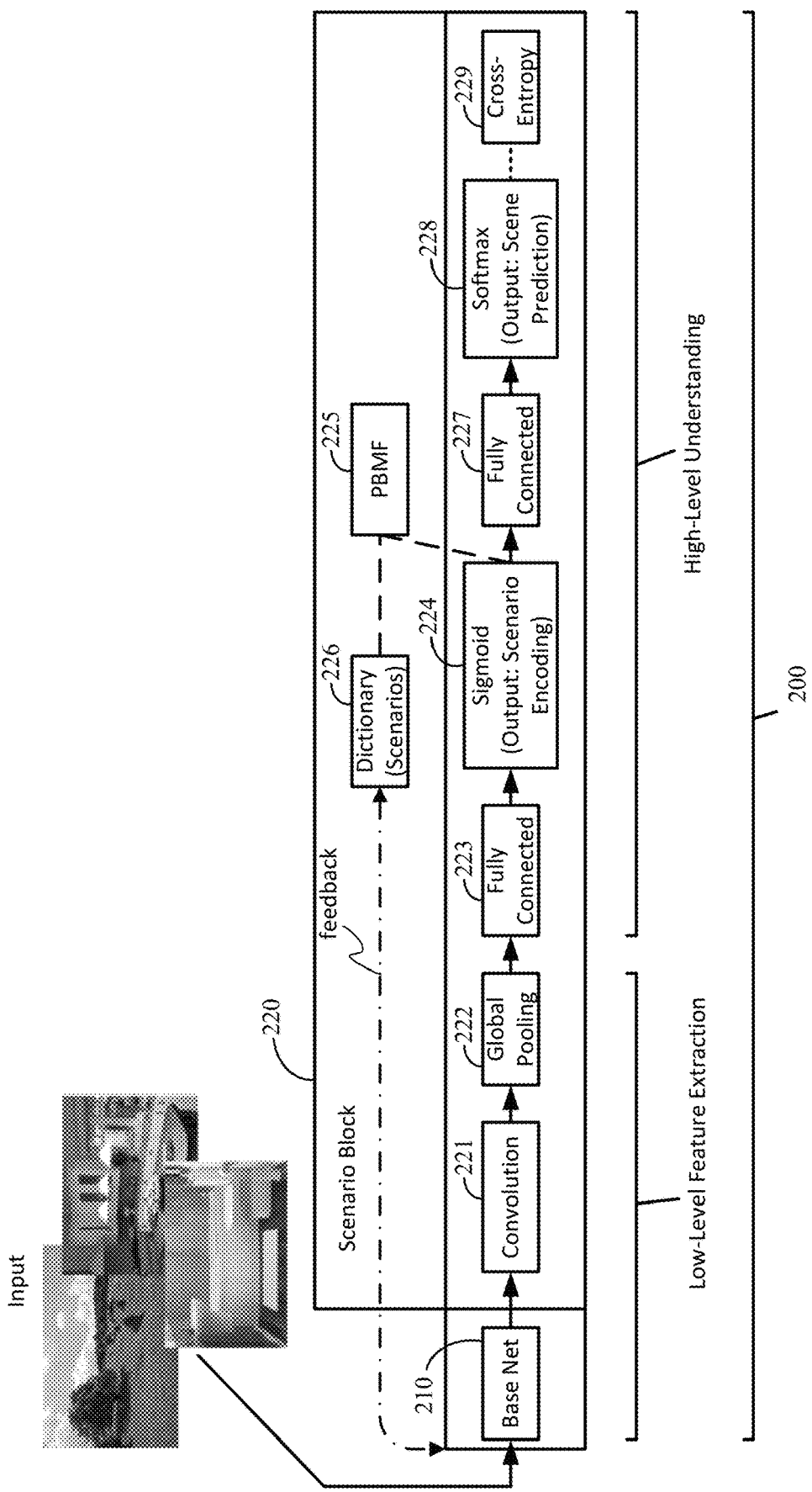
FIG. 2 illustrates a detailed view of an example image processing neural network such as described with respect to FIG. 1A.

FIG. 2 illustrates a detailed view of an example image processing neural network Such as described with respect to FIG. 1A. Referring to FIG. 2, an image processing neural network 200 can include a base net 210 (e.g., 105 of FIG. 1A) and a scenario block 220 (e.g., 130 of FIG. 1A). In the illustrated example, the scenario block 220 has three parts: 1) global pooling layers that identify the parts of an image that the system attends to when recognizing whether each scenario is present in an image, 2) layers that use a Pseudo-Boolean Matrix Factorization (PBMF)-based loss function to learn a dictionary of scenarios and predict the presence and strength of each scenario for a given image, and 3) layers equivalent to a multinomial logistic regression model that use scenarios as low-dimensional, interpretable features for predicting the scene category (e.g., scene classification). In some cases, instead of a PBMF-based loss function, other types of matrix factorization may be used. In some cases, instead of multinomial logistic regression, other classifiers may be used.

Pseudo-Boolean Matrix Factorization (PBMF) can be used to identify scenarios from data. PBMF takes a binary Object-Scene matrix and decomposes it into 1) a dictionary matrix where each basis vector is a scenario and 2) an encoding matrix that expresses a scene instance as a combination of scenarios. PBMF can be integrated into a convolutional neural network architecture (CNN) as part of the scenario block.

For example, in its basic form, the described system 200 can first be trained using a training set of scene instances and a finite set of predetermined objects. Ground-truth annotations are provided for the presence (or lack thereof) of every object in every scene instance given by either humans or object detectors. For each training instance, a vector of object presences is created where each element corresponds to a specific object, and the element is 1 if the object is present and 0 otherwise. These vectors are concatenated to form a matrix A where each row corresponds to a specific object and each column is a training instance. After specifying the number of desired scenarios k (which can be estimated from the data), A is decomposed into two smaller approximately binary matrices: a dictionary matrix W representing a set of scenarios and an encoding matrix H that expresses scene instances as combinations of scenarios. Each column of W represents a single scenario and each row represents an object. If element $W_{ij}$ is 0 or very small, object i is not present in scenario j. The closer $W_{ij}$ is to 1, the more important object i is to scenario j. Each column of H represents a specific scene instance and each row represents a specific scenario. If element $H_{jl}$ is 0 or very small, then scenario j is not present in scene instance l. The closer $H_{jl}$ is to 1, the more important scenario j is to scene instance l.

The PBMF is an approximation of Boolean matrix factorization (BMF) [see P. Miettinen, T. Mielikainen, A. Gionis, G. Das, and H. Mannila, "The discrete basis problem," *IEEE transactions on knowledge and data engineering*, vol. 20, no. 10, pp. 1348-1362, 2008]. In BMF, A, W, and H are binary matrices and the matrix multiplication is Boolean (denoted as ○):

$$\min_{W,H} \|(A - W \circ H)\|_1 \text{ s.t. } W \in \{0, 1\}, H \in \{0, 1\} \quad (1)$$

BMF is well-suited for identifying scenarios from data because: 1) it efficiently compresses and preserves information using low-dimensional representations; 2) the basis vectors are easy to interpret; 3) it discovers meaningful interactions between objects; and 4) the encoding vectors are sparse, so each instance is expressed by a small subset of scenarios.

A gradient descent-based approach is used to solve the optimization problem. The formulation in Eq. 1 is not continuous, so the Boolean matrix multiplication is approximated as W○H≈min(WH,1) and the constraints are relaxed to lie in [0,1]. Using min(WH,1) results in cases where the gradient dies, so a further approximation is made of min (WH,1)≈min(WH,1+0.01 WH). The basic Pseudo-Boolean Matrix Factorization (PBMF) formulation becomes:

$$\min_{W,H} \|(A - \min(WH, 1 + 0.01WH))\|_F^2 \text{ s.t. } W \in [0, 1], H \in [0, 1] \quad (2)$$

Three additional terms are added to Eq. 2: an orthogonality penalty to encourage diversity between scenarios and sparse penalties on the scenario dictionary and encoding to push W and H closer to binary matrices and improve interpretability. A weight matrix $\Omega$ is introduced that decreases the importance of common objects and increases the importance of rare objects.

$$\min_{W,H} \|\Omega \cdot (A - \min(WH, 1 + 0.01WH))\|_F^2 + \quad (3)$$

$$\alpha_1 \|W^T W - diag(W^T W)\|_F^2 + \alpha_2 \|W\|_1 + \alpha_3 \|H\|_1 \text{ s.t. } W \in [0, 1],$$

$$H \in [0, 1], \Omega_{ij} = \max\left(A_{ij} * \left(1 + \log\left(\frac{N_{instances}}{N_{objects}}\right)\right), 1\right)$$

In Eq. 3, "•" denotes element-wise matrix multiplication; as represent tradeoff parameters. Of course, the penalty functions on W and H may be attributed differently (e.g., $\|W\|_1$ instead be provided as $\|W-W^2\|_2$) and the weight matrix may be calculated differently.

In the above discussion, it is assumed that there exists perfect knowledge of all ground-truth object data. This means that if given a previously unseen scene instance, the scenario matrix can be held constant and it is possible to directly solve for the encoding matrix. In practice, object data may not be available at test time. By integrating the PBMF with the CNNs in the image processing neural network system, the scenario encoding for a specific scene instance can be recovered entirely from visual data. The described system can learn to identify and recognize scenarios from real-world visual data, can perform scene classification using the predicted scenario encoding, and can generate attention maps that explain why the net thinks a specific scenario is present in a given image.

In particular, the described system learns to predict an estimated scenario encoding matrix $\hat{H}$ and finetunes the dictionary W to adapt to the noisier $\hat{H}$. W also incorporates feedback from the scene classification task to improve discriminability.

In the example of FIG. 2, the base net 210 may be a neural net such as VGGNet. The final convolutional layers of the VGGNet can be formed as described with respect to Scenario Block 220. Here, a final convolution layer 221 can be fed into a global average pooling (GAP) layer 222. This GAP layer 222 in combination with the class activation mapping technique [see B. Zhou, H. Zhao, X. Puig, S. Fidler, A. Barriuso, and A. Torralba, "Semantic understanding of scenes through the ADE20K dataset," arXiv preprint arXiv: 1608.05442, 2016] allows a user of the system to identify which parts of an image the system attends to when determining if a scenario is present in the image. The output of the GAP layer 222 is fed into a fully connected layer 223 followed by a sigmoid transformation layer 224. The sigmoid layer 224 outputs the scenario encoding vector and enforces each element of the vector is between 0 and 1. This vector indicates how present each scenario is in a given image. The scenario encoding layer (sigmoid layer 224) feeds into a PBMF loss layer 225, which finetunes the scenario dictionary 226 and provides feedback to the network 200. The scenario encoding (from sigmoid layer 224) is also fed into a sequence of layers equivalent to a multinomial logistic regression model that uses scenarios as low-dimensional, interpretable features for scene classification. In this illustrated example, the sigmoid layer 224 feeds into a fully connected layer 227, which feeds into a second classification layer (e.g., softmax layer 228) for scene prediction. Cross-entropy layer 229 accounts for classification loss.

As mentioned above, during training, the system only requires information about the presence (not location) of objects in an image. For scene classification, class labels are also needed during training. During testing, only images are given. An example training process is provided as follows. First, the scenario dictionary is learned using ground-truth object presence data. Then, the net is trained to predict the scenario encodings while the dictionary is finetuned. Next, a classifier (softmax layer 228) is trained for scene classification on top of a frozen net. Finally, the net is jointly finetuned for scenario recognition and scene classification while once again finetuning the dictionary 226. It is useful to finetune only the last few layers of networks that have been previously trained for scene classification (e.g. on the Places dataset [see B. Zhou, H. Zhao, X. Puig, S. Fidler, A. Barriuso, and A. Torralba, "Scene parsing through ade20k dataset," in Proc. CVPR, 2017]) since scenario recognition and scene classification are closely related.

In one example training process, each step of the finetuning process may take between 10 and 20 epochs. To finetune the dictionary while training the net in this example training process, alternating projected gradient descent is used. During training, the scenario dictionary is held constant and the network is finetuned using backpropagation in mini-batches to predict the encoding coefficients. After every four iterations, the network is held constant and a full pass is performed through the data to reconstruct $\hat{H}$ and finetune the scenario dictionary W using projected gradient descent. Alternatively, W can be efficiently finetuned using mini-batches by noting that the gradient of the PBMF loss with respect to W is able to be decomposed as a sum of gradients over sub-batches of $\hat{H}$; thus it is possible to avoid computing the full $\hat{H}$ at any point in time.

As an example training process, the PBMF is performed to obtain an initial dictionary $W^{(0)}$ and ground truth scenarios $H^{(0)}$. Then, the following steps are performed until a stopping criteria on the validation data is met. 1) the ground truth scenarios are pruned based on the l-2,1 norm of $H^{(0)T}$; 2) the threshold is set at $H^{(t)} \geq 0.5$; 3) the CNN is trained to estimate scenario presence from images; 4) the predicted scenario probabilities $\hat{H}^{(t)}$ are extracted from all training examples; 5) the dictionary is refined by holding $\hat{H}^{(t)}$ constant and solving for $W^{(t)}$; and 6) new ground truth scenarios can be obtained by holding $W^{(t)}$ constant and solving for $H^{(t+1)}$.

Figure 3:
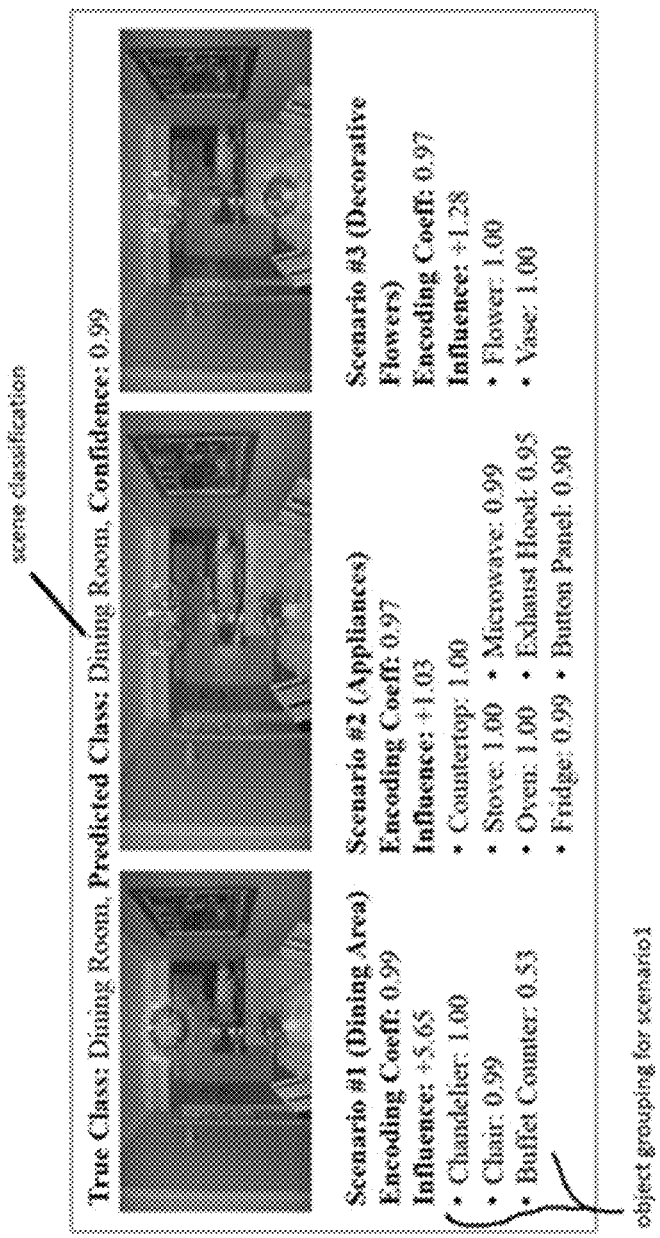
FIG. 3 shows an example output of an image processing neural network.

FIG. 3 shows an example output of an image processing neural network. As illustrated in FIG. 3, using the system such as described with respect to FIG. 2, semantic information can be recovered about scene images at three levels of granularity: 1) scene categories, 2) scenarios, and 3) objects. This enables training of a single model capable of performing 1) scene classification, 2) scenario recognition, 3) multi-object recognition, 4) content-based scene image retrieval, and 5) content-based image comparison.

Given an input image, system 200 can provide 1) a probabilistic scene class assignment (e.g., Predicted Class: Dining Room; Confidence: 0.99), 2) a vector of scenario encoding coefficients (e.g., representing the probability of each scenario), 3) the dictionary of scenarios (indicating objects in each scenario), and, optionally, 4) activation maps that can be used to localize the discriminative parts of each scenario.

The output illustrated by FIG. 3 shows an example of decomposing a scene instance into its top-3 strongest detected scenarios. It can be seen that the system correctly predicts with high confidence that the scene category is "dining room". The top-3 scenarios support this: one focuses on dining areas, one on kitchen appliances, and one on decorative flowers. The encoding coefficient denotes the strength of each scenario. Note that all of the encoding coefficients are close to one since these are the strongest detected scenarios. As this coefficient decreases, the scenarios become less present. Encoding coefficients tend to cluster around 0 and 1. Recall that the system uses scenarios as features for scene classification.

It is possible to define a scenario's influence score for a specific class to be the corresponding weight in the multinomial logistic regression model. If the influence is a large positive number, the scenario provides strong evidence for the specified class. If it is a large negative number, the scenario is strong evidence against a specific class. For this image, scenario 1 is very indicative of the scene class, while scenarios 2 and 3 are weakly indicative.

It is also possible to see how important each object is to each scenario. For example, in scenario 1, the "chandelier" and "chair" objects are more important to defining the scenario than the "buffet counter" object. By examining the scenario activation maps, it can be seen that each predicted scenario is present and net attends to regions of the image containing objects present in the scenarios.

The described system is useful for content-based scene image retrieval because it can retrieve images satisfying a set of high-level criteria based on the scene category, scenarios, and objects present in an image (e.g. find images of scene category A OR B THAT CONTAIN scenarios X AND Y but EXCLUDE object Z). Often, it is desirable to query for broad concepts and not individual objects. Scenarios offer a nice compromise between global (scene category) and local (object) information. It is easy for humans to examine the scenario dictionary and form complex queries because scenarios are low-dimensional and interpretable. Scenarios can also act as an efficient hashing mechanism because they are low-dimensional and approximately binary, so memory requirements are low and retrieval can be performed in an efficient manner.

Figure 4:
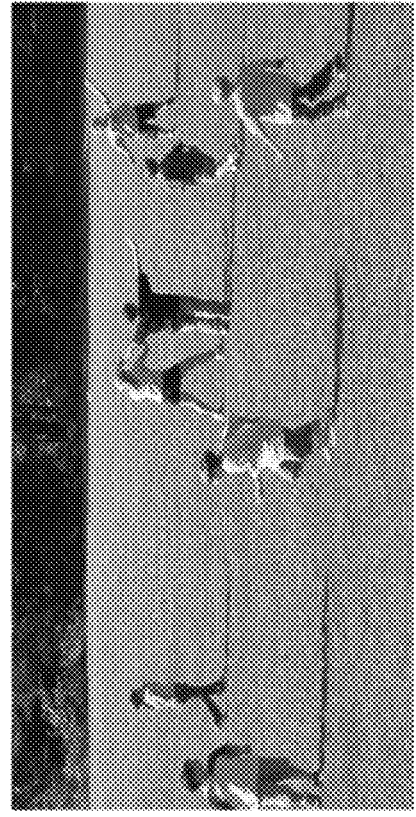
FIG. 4 shows an example output of using an image processing neural network to find high-level similarities and differences between two images.
Figure 4:
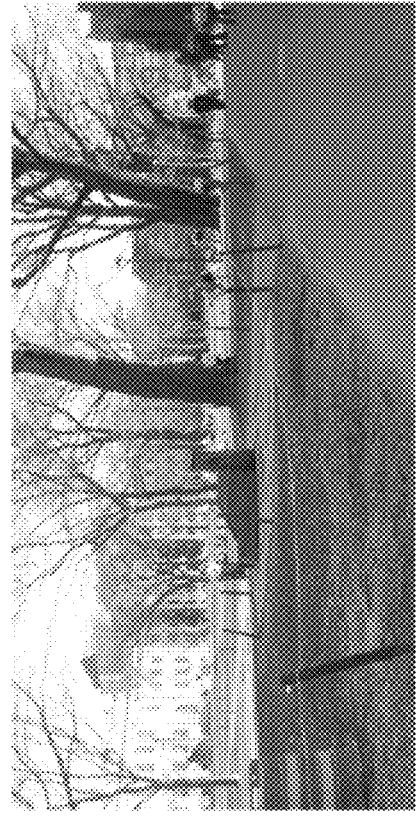

FIG. 4 shows an example output of using an image processing neural network to find high-level similarities and differences between two images. Referring to FIG. 4, it can be seen that an application can receive a query "How are the images similar?" Because the system provides the vector of scenario encoding coefficients for each image, the application can identify similarities with respect to scene class assignment and scenario (including objects). Here, the application can identify, using the output of the net, that the two images are similar because both images are "park" scenes; and the two images share the following scenarios: A) person; and B) grass, path, earth, tree.

The application can receive a query "How do the images differ?" Because the system provides the vector of scenario encoding coefficients for each image, the application can identify differences with respect to scenarios (including objects). Here, the application can identify, using the output of the net, that the two images are different because Image 1 contains the scenario C) head, arms, legs, bag; while Image 2 contains the scenario D) building, lamp, road, sidewalk, window.

As can be seen, it is possible to generate a quick overview of the similarities and differences between two scene images without relying on (often unnecessary) information about individual objects.

FIG. 5 illustrates a detailed view of an example image processing neural network with extension. The extension provided in the neural network of FIG. 5 can be used to include higher-level content in scene identification. For example, rich information from reports can be integrated with a neural network model to improve the performance of automated biomedical image analysis and in some cases, produce reports directly from images. The illustrated example is suitable for medical imaging analysis such as chest x-ray analysis.

Similar to the configuration described with respect to the example system 200 of FIG. 2, system 500 includes a low-level feature extraction 510 formed of a base net (e.g., base net 105, 210) and part of a scenario block 520, including final convolutional layers such as convolution layer (e.g., layer 221 of FIG. 2) and a global pooling layer (e.g., GAP layer 222 of FIG. 2).

The output of the low-level feature extraction 510 is fed into a fully connected layer 521 followed by a sigmoid transformation layer 522. The sigmoid layer 522 outputs the scenario encoding vector and enforces each element of the vector is between 0 and 1. This vector indicates how present each scenario is in a given image. The scenario encoding layer (sigmoid layer 522) feeds into a PBMF loss layer 523, which finetunes the scenario dictionary 524 and provides feedback to the network 500. In the extension, both the scenarios and the key words from the natural language text/reports are included in dictionaries. That is, the dictionary consists of the scenarios, which are made up on key terms extracted from the natural language text. The dictionary 524 can include an unconstrained dictionary matrix 525 and sigmoid classifier 526, which constrains the dictionary.

By bottlenecking through the topic modeling layer (e.g., encoding layer 522 and PBMF 523), the net is forced to "think" like an expert. In addition, unlike in the example of FIG. 2, the linear classification block (e.g., softmax layer 228) is replaced with a non-linear block (e.g., classifier layer 530, which may be a sigmoid classifier). In particular, the scenario encoding (from sigmoid layer 522) feeds to a fully connected layer 527, which then feeds to a rectified linear layer 528, which then feeds to a fully connected layer 529, which then feeds to the classifier layer 530 for scene prediction. Cross-entropy layer 531 accounts for classification loss.

In the system shown in FIG. 5, simultaneous optimization over W and H(X, N) is performed instead of performing alternating optimizing. An initial dictionary matrix W is first solved outside of the network and then the dictionary matrix W is finetuned inside the net. This reduces the number of iterations needed to reach convergence and helps converge to a better topic dictionary.

Advantageously, the use of the "scenarios" grouping objects in the image enable an explanation as to why identified areas are important for the given prediction. Further, since the extension can incorporate expert knowledge, the neural network does not require making diagnoses "from scratch".

For an example implementation using system 500, given a set of images, a set of corresponding natural language findings, and one or more corresponding Medical Subject Headings (MeSH) labels (see e.g. FIG. 6), the described deep neural network model, during training, simultaneously 1) constructs a topic model (the scenario model), which clusters key terms from the findings into meaningful groups (e.g. "lungs", "clear", and "expanded" might form a topic), 2) predicts the presence or (lack thereof) of each topic for any given input image based on learned visual features, and 3) uses an image's topic encoding as features to predict one or more diagnoses.

For the text-based portion (e.g., the set of corresponding natural language findings), an initial set of key terms can be extracted from a database of reports. Any suitable method may be used. In the example implementation, when extracting an initial set of key terms from a database of reports, for each document, simple rule-based negative scope detection was applied to capture negation, so phrases like "no pleural effusion" are parsed as "pleural effusion-neg". Next, stop words (i.e., common words like "the") were removed. Important n-grams can then be identified (e.g., "pleural effusion", "focal airspace disease", "pneumothorax", etc.). Finally, a bag of key terms representation was extracted from all documents. Terms that appeared fewer than a threshold amount of times were pruned. For the example implementation, a set of 600-700 key terms were created. Of course, the number of key terms varies depending on the training fold.

The naive way to incorporate text information into a visual neural network model would be to directly predict the bag-of-key terms for each image. Several problems exist with this approach. L) The key term extraction process is not perfect, so "pleural effusion", "pleural effusions", and "effusion" might be extracted as different terms, making it difficult to learn a classifier for each individual term, 2) Synonyms and abbreviations present similar problems, e.g. "copd" and "chronic obstructive pulmonary disease," 3) Sometimes multiple key terms are needed to describe the x-ray, so "cardiac silhouette" is not useful by itself but becomes useful when paired with "unremarkable". 4) A lot of redundancy exists between terms based on co-occurrence, e.g. "normal cardiac silhouette" and "normal mediastinum size" very frequently appear together. 5) These problems lead to a very high-dimensional representation, and there are limited training examples, making it difficult to learn fine-grained classifiers. Instead of considering individual key terms, it is possible to exploit context between terms to form a lower-dimensional set of topics, and then use the neural network to try to predict these topics.

For the PBMF (e.g., layer 523), supposing a binary matrix A where each row represents a key term and each column represents a document (report). All is 1 if key term i is present in document j and 0, otherwise. The matrix can be factorized into a dictionary matrix W which clusters related key terms into groups and an encoding matrix H which indicates which topics are present in each document.

The PBMF can be given as:

$$\min_{W,H} \|\Omega \cdot (A - \min(WH, 1 + 0.01WH))\|_2 + \alpha_1\|H\|_1 +$$
$$\alpha_2\|W\|_1 + \alpha_3\|W^TW - diag(W^TW)\|_2 \text{ s.t. } W, H \in [0, 1].$$

Here, the first term reconstructs the document-term matrix using approximate Boolean matrix multiplication, the second and third terms encourage sparsity in the encoding and dictionary matrices, and the final term reduces redundancy in the dictionary by enforcing orthogonality between dictionary vectors. The relative rareness of each key term is accounted for when computing the reconstruction error using the inverse document frequency: $\Omega=\max(idf(A)\cdot A, 0.25)$ see also Eq. 3 above). In the extension example of FIG. 5, the topic model loss included in PBMF can be combined with the classification loss and the PBMF optimization problem can be reformulated as a loss function which can be solved by a neural network where X represents the input training images and N represents the learnable network parameters:

$$\mathcal{L}_r = \|\Omega \cdot (A - \min(W''H'', 1 + 0.01W''H''))\|_2 + \alpha_1\|H''\|_1 + \alpha_2\|W''\|_1 + \alpha_3\|W''^TW'' - diag(W''^TW'')\|_2.$$

$$W''=sigmoid(W), H''=sigmoid(H(X,N)).$$

During training, ground-truth labels 532 can be input as part of classification loss (multi-label cross-entropy layer 531).

At test time, only images are needed as input. Since the net learns the topic model/scenario model jointly with the classifier, system 500 provides a powerful tool for investigating which semantic concepts the net might be exploiting when making diagnoses. Since the net is constrained to predict topics based on expert-annotated reports and then these topics are used to make predictions, the net is able to learn higher-level features that it might have otherwise missed when relying only on visual information.

Figure 6:
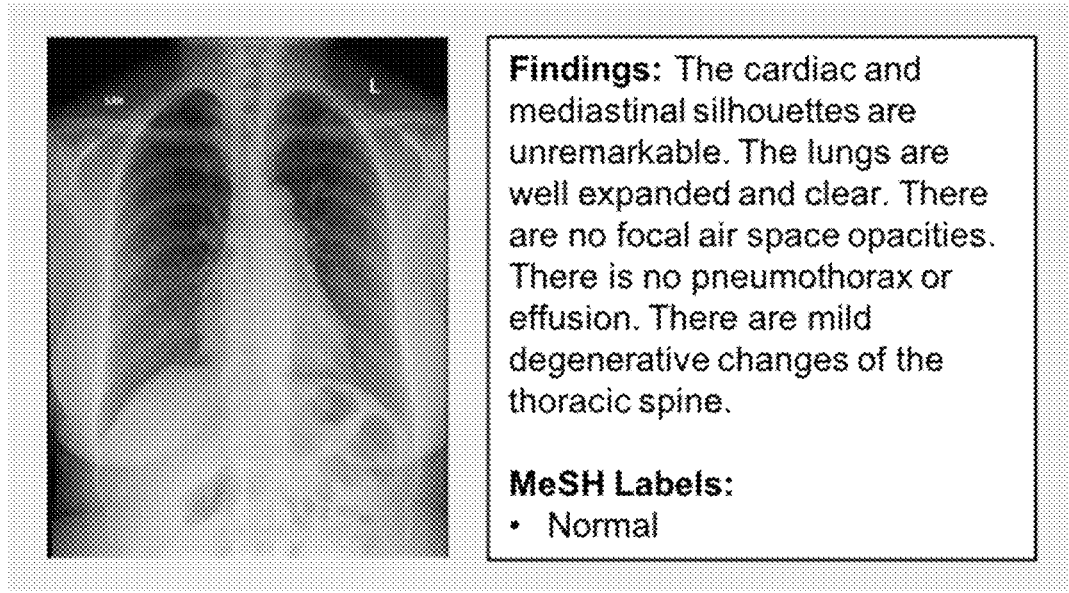
FIG. 6 shows an example ground-truth report for an example implementation for an image processing neural network with extension for chest x-ray analysis.

FIG. 6 shows an example ground-truth report for an example implementation for an image processing neural network with extension for chest x-ray analysis.

Visual inspection of chest x-rays is one of the most common and most important methods for diagnosing certain life-threatening diseases such as pneumonia. However, manual examination of chest x-rays is a time-consuming process that involves significant effort by highly-trained radiologists. (Semi-)automated chest x-ray analysis using computer vision and machine learning algorithms can act as a support tool for radiologists, allowing them to make faster diagnoses and spend more time focusing on difficult cases.

The described net with extension (e.g., system 500 of FIG. 5) exploits both visual and textual information for improved automated chest x-ray analysis.

Many chest x-rays come with radiologist-dictated reports that provide a rationale for why each diagnostic impression was made. This textual information can be incorporated as part of an extension of a neural net as described with respect to FIG. 5.

Accordingly, given frontal-view x-rays, a set of corresponding natural language findings, and one or more corresponding MeSH labels, the described deep neural network model, during training, simultaneously 1) constructs a topic model (the scenario model), which clusters key terms from the findings into meaningful groups (e.g. "lungs", "clear", and "expanded" might form a topic), 2) predicts the presence or (lack thereof) of each topic for any given input image based on learned visual features, and 3) uses an image's topic encoding as features to predict one or more diagnoses. At test time, only images are needed as input.

Figure 7:
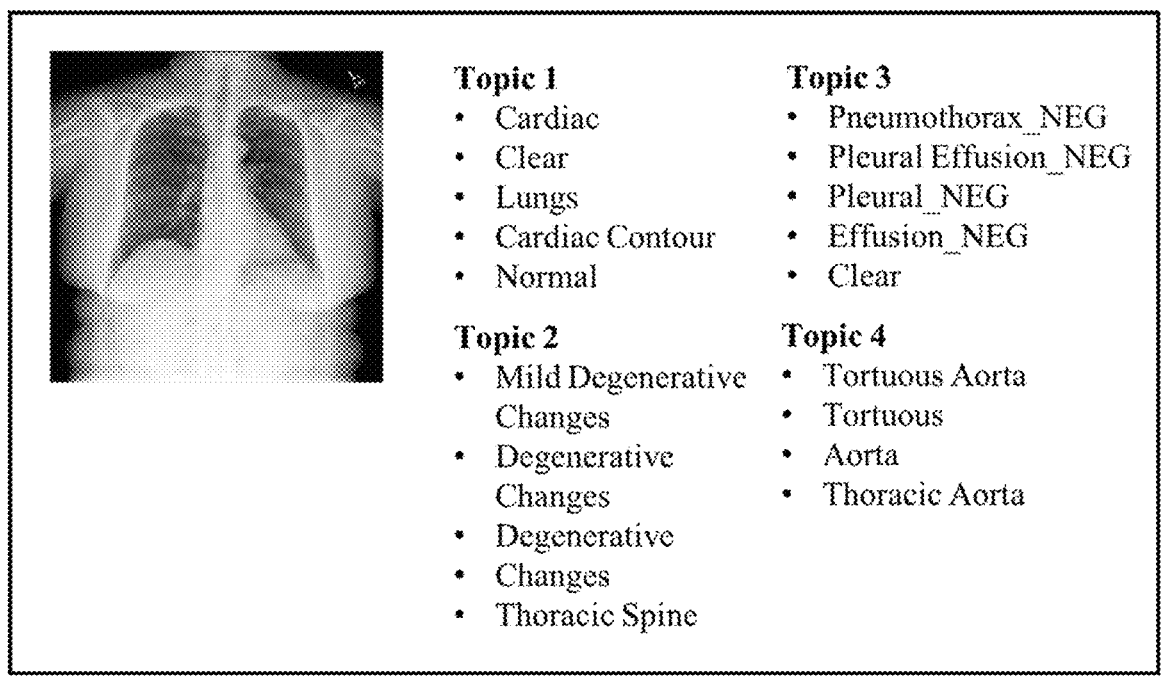
FIG. 7 shows an example output with topics for an example implementation for an image processing neural network with extension for chest x-ray analysis.

FIG. 7 shows an example output with topics for an example implementation for an image processing neural network with extension for chest x-ray analysis.

Referring to FIG. 7, an example of an x-ray and its highly-ranked topics is shown, demonstrating some of the types of concepts the net attempts recognize and showing the utility and potential of using topics as an interpretable intermediate feature layer. Bottlenecking through the topic modeling layer is useful in 1) helping the net discover more discriminative features and 2) understanding what the net is attempting to learn. As more training data is obtained, the topic encodings should be predicted with greater accuracy and robustness, leading to improved interpretability.

As previously mentioned, the described systems and methods can be used in applications such as human-machine teaming, robotics, medical image diagnostics, surveillance, and autonomous vehicles. Indeed, scene classification is an important computer vision problem with applications to a wide range of domains including remote sensing, robotics, autonomous driving, defense, and surveillance.

Figure 8A:
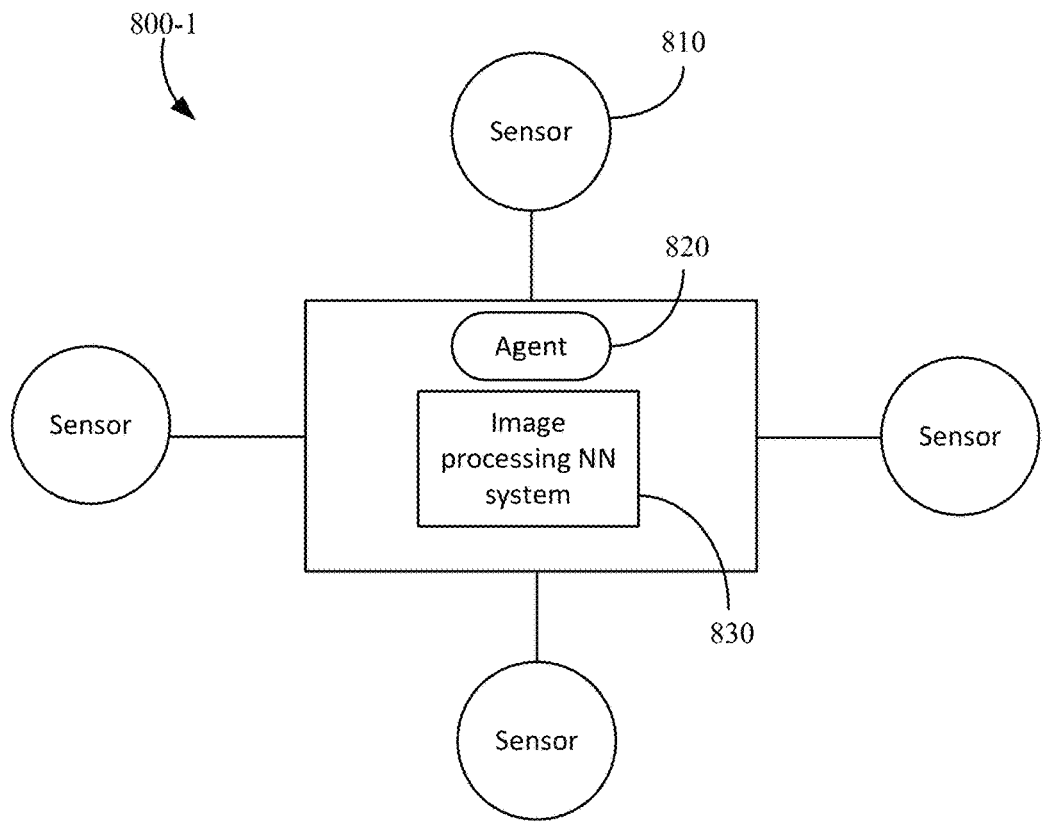
FIGS. 8A and 8B illustrate example robots using the described image processing neural networks.
Figure 8B:
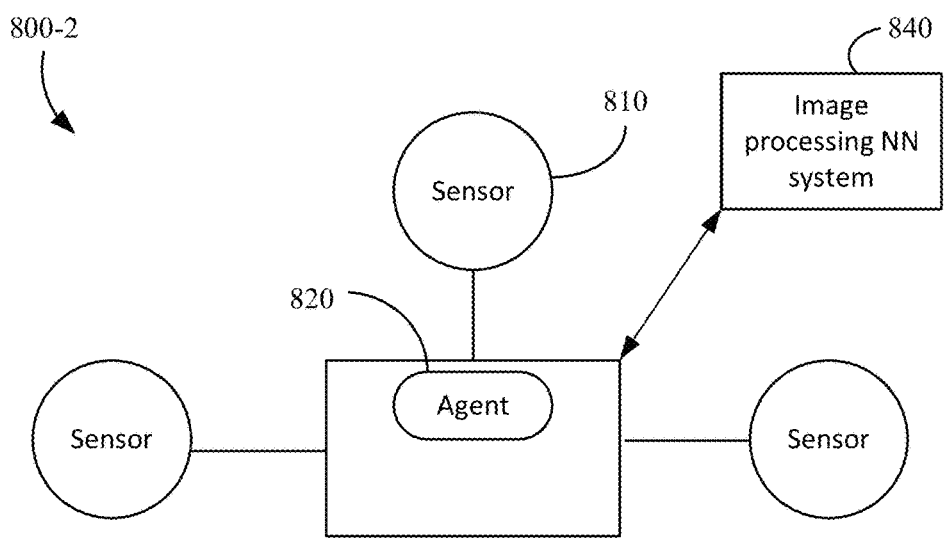
Figure 8C:
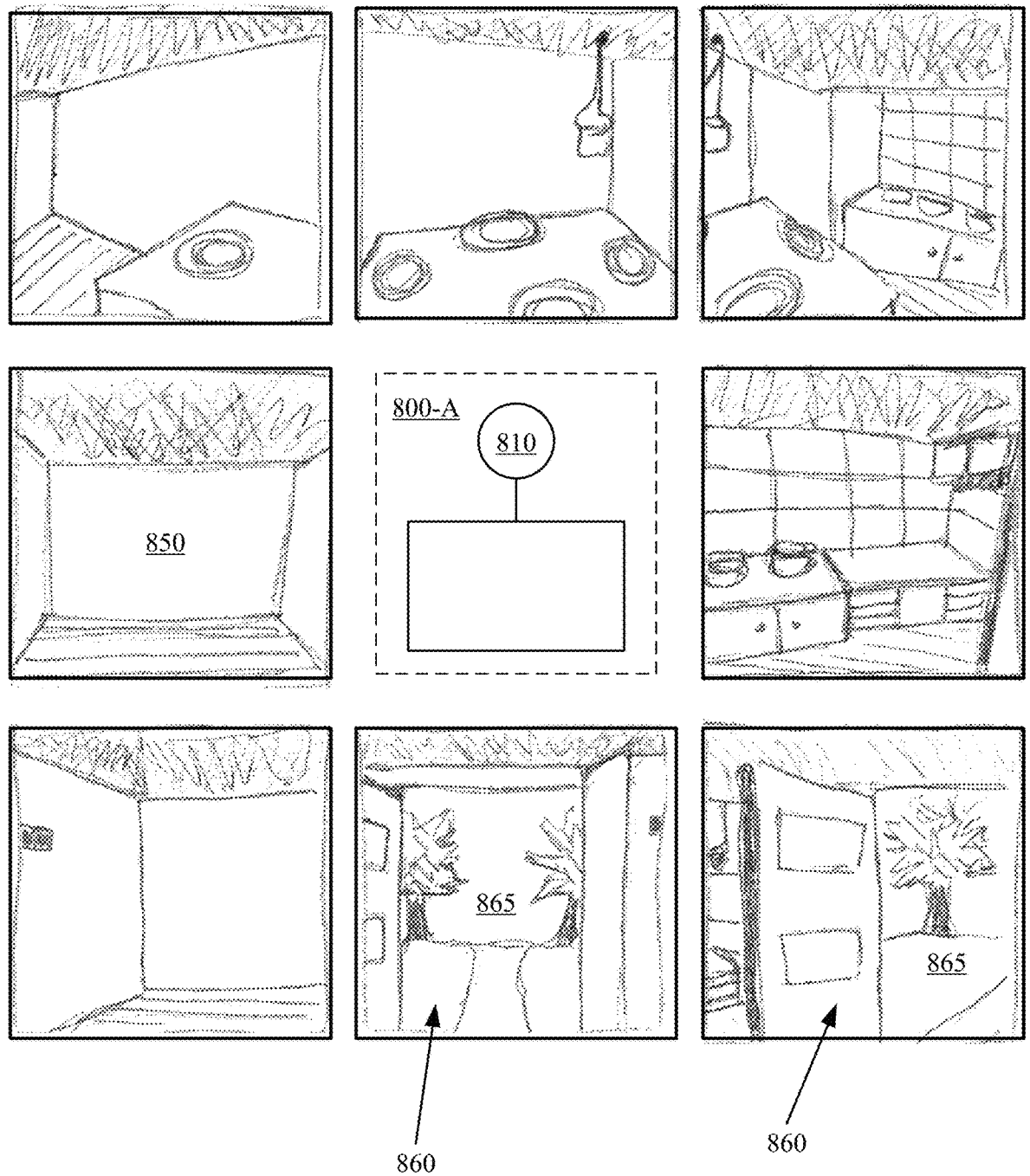
FIG. 8C illustrates an example environment for active explanation-driven classification of indoor scenes.

FIGS. 8A and 8B illustrate example robots using the described image processing neural networks; and FIG. 8C illustrates an example environment for active explanation-driven classification of indoor scenes. Referring to FIGS. 8A and 8B, a robot 800-1, 800-2 can include at least one sensor 810 and an agent 820 (e.g., application). Robot 800-1 further includes an image processing neural network system 830, which may be implemented with features such as described with respect to systems 100 and 200 of FIGS. 1A and 2, respectively; and Robot 800-2 communicates with a remote (e.g., cloud-based or simply separately located) image processing neural network 840, which may be implemented with features such as described with respect to systems 100 and 200 of FIGS. 1A and 2, respectively.

Referring to FIG. 8C, consider robot implementation 800-A, which may be configured as robot 800-1 or robot 800-2, exploring an indoor environment. In this example, the robot implementation 800-A includes a single sensor 810 (e.g., camera) and can adjust its orientation (e.g., by adjusting the orientation of the robot itself or by adjusting the sensor). The images acquired while within the environment may be noisy and adversarial. For example, if the robot 800-A is randomly placed within the environment, it might encounter 1) views that are very uninformative (e.g., the robot is facing a blank wall 850) or 2) views that are adversarial (e.g., the robot is looking through a doorway 860 or window into a different type of scene 865).

The described method of image classification with scene understanding can be used where an agent/robot with an imaging sensor (e.g., robot 800-A) is placed in some environment, and based on its sensory input, the agent/robot needs to assign a label to the perceived scene. The described method provides an efficient mechanism for the agent/robot to understand the scene and minimize the need to adjust its sensor to capture more details about the scene (which reduces the costs—such as in power—associated with manipulating the sensor). The robot 800-A, performing the described method is able to understand the global state of a scene (e.g., the scene category or events taking place in the scene) by extracting properties about the scene from multiple views (e.g., multiple images) and using these properties to generate human-understandable explanations about why certain predictions were made.

The aforementioned setting is relevant to applications related to remote sensing, situational awareness, and surveillance. Consider the case where the agent is an aerial vehicle surveying some region. The vehicle has a camera attached (e.g., electro-optic, infrared, etc.) and it must make decisions about the land it is surveying. In remote sensing applications, may be the agent is trying to determine which plots of land are best suited for specific types of crops, or in military applications, the agent might be trying to determine if some region is controlled by enemy forces. The cost associated with sensor adjustment maps directly to the amount of fuel needed to physically adjust the aerial vehicle.

Another example includes understanding whether a crime or terrorist attack is being committed based on a network of surveillance cameras. Instead of having to analyze tens to hundreds of cameras, the system can make a fast decision about whether police intervention is necessary by focusing on the video output by just a few key cameras. Here, the cost is the number of camera views that are presented to police analysts.

In both of the aforementioned cases, the agent first detects key human-understandable properties of the scene. In the remote sensing application, these properties might include soil type, volume of natural vegetation, etc.; in the military application, these properties might include the presence of different types of vehicles, the number, size, type, and density of buildings, the presence of weapon systems, etc.; and in the surveillance application, these properties include crowd density, movement patterns, etc.

Using these properties the agent makes a decision to: 1) with high confidence, assign a label to the scene and explain why this decision was made, so a human can make an informed decision with respect to next steps (e.g., planting a specific crop, devoting additional resources to surveying a potential enemy base, calling for police intervention), 2) manipulate the sensor to capture more information and better understand the scene, or 3) identify that the scene is atypical, query a human for additional input, and improve the underlying data-driven (and often machine learning-based) models needed for the agent to process and synthesize the sensor data. In this way, there is a feedback control loop between sensor manipulation and data-driven modeling, exhibiting properties of Dynamic Data-Driven Applications Systems (DDDAS). The computational models tell the agent how to adjust its sensors, and when atypical data is captured by the sensor, the underlying computational models are updated to account for this data.

Figure 9:
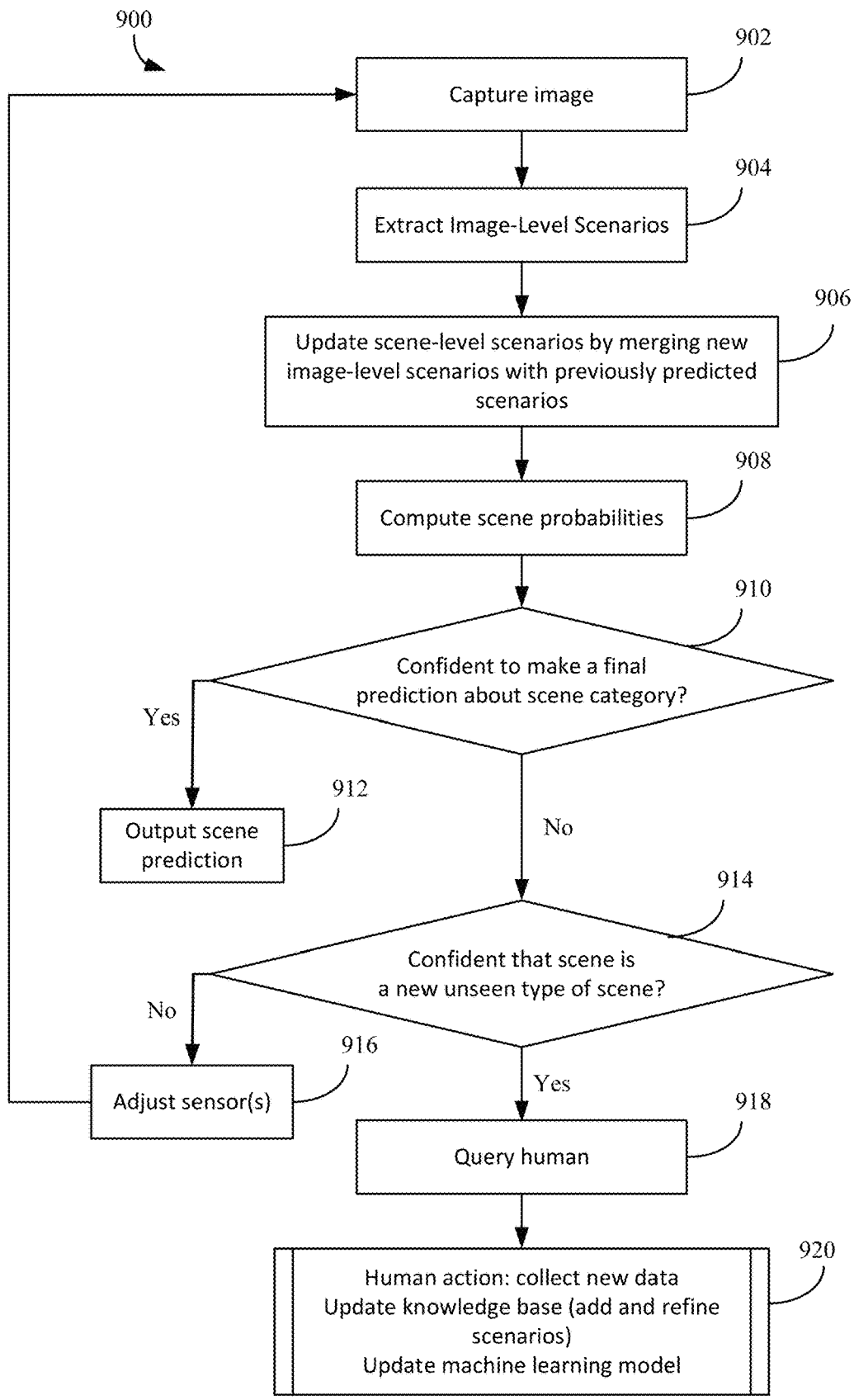
FIG. 9 illustrates an example method of image classification with open set recognition and active learning.

A closed set of assumptions about scene categories are rarely satisfied in real-world applications, including those described above with respect to autonomous vehicles, remote sensing, situational awareness, and surveillance. Sometimes, an agent will encounter a scene unlike any it has previously encountered. Instead of making a misleading and incorrect prediction about the scene category based on the false assumption of a closed world, the agent is able to refuse to make a prediction, and subsequently, query a human for help, collect more data about the new type of scene, and update its internal knowledge and machine learning models. This behavior is referred to as open set recognition and active learning, and a method carried out by robot 800-1 or 800-2 can be performed such as shown in FIG. 9. For open set recognition, a classification model can either 1) assign a label from a known closed set of labels, or if confronted with an instance of a new class, 2) reject making a decision about the class assignment and flag the instance as belonging to a new class.

Given an application such as illustrated in FIG. 8C, which is an active explanation-driven classification of an indoor scene. It can be assumed that the robot 800-A is placed in the center of an indoor room and with few sensor adjustments, is tasked with assigning a category to the scene (e.g., kitchen, bathroom, etc.). After the robot 800-A is situated, the robot 800-A 1) captures an image, 2) based on the captured image, extracts relevant human-understandable semantic information about the scene, and 3) using this information must make a grounded decision about which action to take next. The robot 800-A can 1) assign a label to the scene, 2) adjust the orientation of its camera to gather more information about the scene, or 3) determine that the scene is unlike any the robot 800-A has seen before and request more information from humans. If the robot 800-A adjusts its sensor, the robot 800-A fuses existing information with newly obtained information. If the robot 800-A identifies a new type of scene, robot 800-A can 1) augment/update its existing knowledge base, and 2) augment/update its visual recognition models. An example method performed by agent 810 (in conjunction with image processing neural network 830, 840) of robot 800-A is illustrated in FIG. 9.

FIG. 9 illustrates an example method of image classification with open set recognition and active learning. Referring to FIG. 9, method 900, which is modeled as a Markov Decision Process, begins with capturing (902) an image. From the visual data of the image, the agent/system extracts (904) human-understandable semantic information (e.g., image-level scenarios). The scene-level scenarios can be updated by merging (906) the semantic information about the scene (e.g., the new image-level scenarios that were extracted from the visual data of the image) with previously collected information (e.g., previously predicted scenarios) about the scene. The agent/system then computes (908) predicted probabilities for each scene category based on the semantic information.

In a specific implementation, a state, as output from the computation, can be the vector of class probabilities output by a Weibull-Calibrated Support Vector Machine (W-SVM) concatenated with a rejection score (e.g., one minus the maximum probability output by W-SVM), and the number of views seen). From the computed state, it is possible to make a class prediction, reject making any decision and end the exploration process guided by method 900, adjust the sensor 810 (e.g., a camera) to a nearest unseen view, and adjust the sensor to a furthest unseen view.

In a specific implementation, a W-SVM can be combined with scenarios to support the open set classification. The W-SVM formulation makes use of a one-class SVM and a one-vs-rest SVM, both trained for each of the known classes. For each of these models, Weibull distributions are fit based on the distances between a training sample (in feature space) and each decision boundary. Using the W-SVM, it is possible to recover the probability that the instance belongs to the given class for a given set of features. If this probability falls below a given threshold for all of the classes, the agent rejects making a prediction; otherwise, the agent predicts the class with the largest probability. An RBF kernel is used for the OC-SVM. A linear kernel is used for the one-vs-rest SVM, resulting in an explainable model that combines an easy-to-interpret classifier with understandable features.

Once a new scene category is encountered—as identified using the W-SVM, the dictionary of scenarios and machine learning models (e.g., CNNs for scenario recognition) can be updated to account for the new information, which is the active learning aspect that the described method incorporates to support dynamic scenarios.

The scenario block PBMF layer (e.g., PBMF 225 of FIG. 2) can be implemented using a "dynamic PBMF", which dynamically updates the scenario dictionary using instances from a new scene category.

The dynamic PBMF can involve solving for a small matrix $W^{(c)}$, representing class-specific scenarios, using only ground truth object data from the new class instances $A^{(c)}$:

$$\min_{W^{(c)}, H^{(c)}} P0 + \alpha_1 * P1 + \alpha_2 * P2 + \alpha_3 * P3 + \alpha_4 * P4$$

$$\text{s.t. } W^{(new)} \in [0,1], H^{(c)} \in [0,1], W^{(new)} = [W, W^{(c)}]$$

$$\Omega_{ij} = \max\left(A_{i,j}^{(c)} * \left(1 + \log\left(\frac{N_{instances}}{N_{objects}}\right)\right), 0.5\right),$$

$$P0 = \|\Omega \cdot (A^{(c)} - \min(W^{(new)} H^{(c)}, 1 + 0.01 W^{(new)} H^{(c)}))\|_F,$$

$$P1 = \|H^{(c)} - H^{(c)2}\|_F, P2 = \|W^{(new)} - W^{(new)2}\|_F,$$

$$P3 = \|H^{(c)T}\|_{2,1},$$

$$P4 = \|W^{(new)T} W^{(new)} - diag(W^{(new)T} W^{(new)})\|_F$$

Then, every time a new class c is added, the relation is solved for new class-specific scenarios $W^{(c)}$ and these new class-specific scenarios are appended the existing dictionary $W^{(new)} = [W; W^{(c)}]$.

Not only can the scenario dictionary be updated in a dynamic manner using, for example, the W-SVM and dynamic PBMF approach described above, it is possible to efficiently learn models that can recognize these new scenarios from visual data without having to retrain the CNN model using all previously collected data. In one implementation, a cascade of CNN models are used: when a new class is encountered, anew set of class-specific scenarios is learned using Dynamic PBMF, and a CNN is trained for multi-scenario recognition on just the new scenarios using only data for the new classes, resulting in separate scenario recognition models for each class-specific scenario dictionary.

In addition, different views of a scene, captured by a single sensor or by multiple sensors of a robot, can be fused by a simple max pooling to address the high-level information fusion (HLIF) used by the an agent/robot such as robot 800. For example, the system can naively fuse information from all views by outputting the scene category which has the maximum predicted probability when all individual view prediction probabilities are max-pooled. Results of using this technique suggest object presence is a powerful representation for scene classification, outperforming the visual features.

Returning to FIG. 9, a decision (910) is made based on how confident the system is to make a final predication about scene category ("the scene assignment"). Based on the predicted probabilities (e.g., a confidence score for the scene assignment), if the system determines in decision 910 that there is sufficient confidence regarding the prediction, the system outputs (912) a final prediction for the scene category ("the scene assignment"). If the system determines in decision 910 that there is insufficient confidence regarding the prediction of a scene, the system rejects making any decision about the scene category, and a decision (914) is made based on how confident the system is that the scene is a new unseen type of scene.

Again using the predicted probabilities, if the system determines in decision 914 that there is insufficient confidence that the scene is new, the system adjusts (916) the sensor(s). In some cases, the system may adjust the camera to a nearest unseen view or may adjust a sensor to a furthest unseen view. When the sensor is adjusted, the method 900 can begin again using the image captured from the new sensor position. If the system determines in decision 914 that there is sufficient confidence that the scene is new, the system can end exploration and request human intervention, for example, by querying (918) a human to see if new data must be collected (e.g., for unknown scenes), and then using this newly collected data, the system can update the knowledge representation and visual recognition models (920). The querying may be via a user interface or via a predetermined communication channel (e.g., email, SMS, push notification).

In a specific implementation, rewards may be defined as −1 if the view is changed when the agent would have made the correct prediction, −8 if the model predicts an incorrect class, −8 if the model refuses to make a prediction and ends exploration when it would have predicted the correct class, and 8+(number of remaining unseen views)$^{1.5}$ if a correct classification is made. The terminal states are when either a prediction is made or the agent rejects making a prediction and ends exploration. A linear function approximation of the Q-value with experience replay can be used as the reinforcement learning algorithm.

Figure 10:
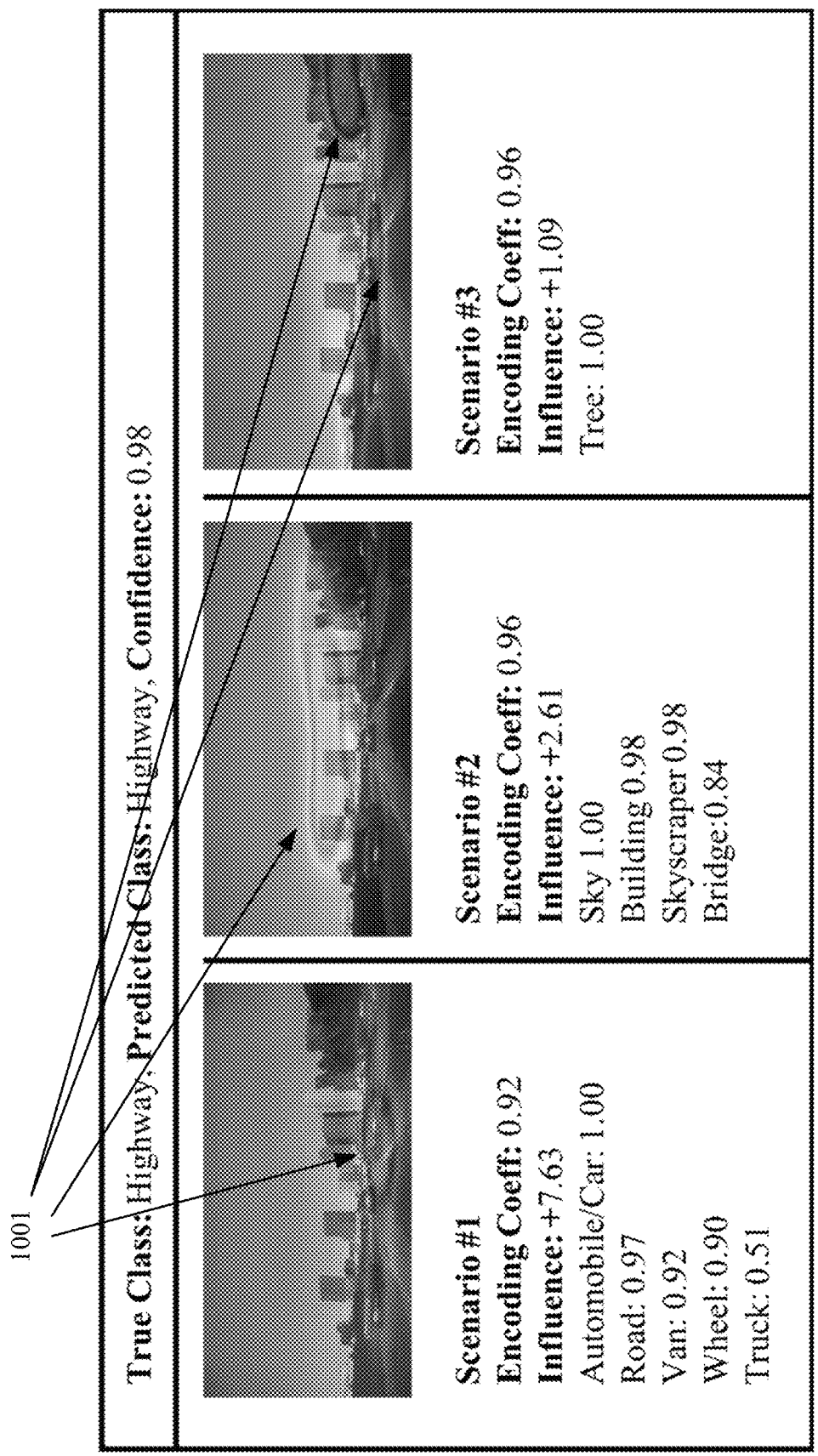
FIG. 10 shows an example output of an image processing neural network for an autonomous vehicle application.

FIG. 10 shows an example output of an image processing neural network for an autonomous vehicle application. Autonomous driving systems often rely on detailed high-definition maps of the environment which contain some static information about the environment and convey geometric and semantic information about the scene. These maps provide strong a priori knowledge that enhances the effectiveness of various internal components of an autonomous vehicle. However, the information captured by these maps changes over time, and as a result, the maps used by autonomous driving systems are not always immediately updated and might contain inaccurate or incomplete information.

Therefore, some autonomous vehicles augment the information present in the static maps, by capturing data using various sensors attached to the vehicle in an online fashion, and subsequently using this data in machine learning algorithms to extract geometric and semantic information. In the last decade, DNNs have become the gold standard for solving challenging problems in computer vision and scene understanding, especially when the data is captured using complex sensors (e.g., RGB/RGB-D cameras, LIDAR, etc.). The described image processing neural network system can be used to provide interpretable models for decision making.

For example, as shown in FIG. 10, an image captured by a camera on an autonomous vehicle can be analyzed by an image processing neural network system such as described herein. In this example, the top three predicted scenarios are shown. The network outputs a predicted class with a probabilistic confidence score. Here, the predicted class is highway with a confidence score of 0.98, which is correct since the true class is a highway. The predicted scenarios are based on the encoding coefficients (which, as described with respect to FIGS. 2 and 3) indicate how "present" each scenario is in an image). For example, scenario #1, which includes the elements of automobile/car, road, van, wheel, and truck, has an encoding coefficient of 0.92, scenario #2, which includes the elements of sky, building, skyscraper, and bridge, has an encoding coefficient of 0.96, and scenario #3, which includes the element of a tree, has an encoding coefficient of 0.96. Each scenario also has an influence score (the corresponding weight in the logistic regression model for a given class), which indicates how much a scenario contributes in favor of or against the classification decision. For example, scenario #1 has an influence score of +7.63, scenario #2 has an influence score of +2.61, and scenario #3 has an influence score of +1.09. The network also can output activation maps 1001 for each scenario, which indicate where the network attends to when prediction the scenario coefficient.

Figure 11:
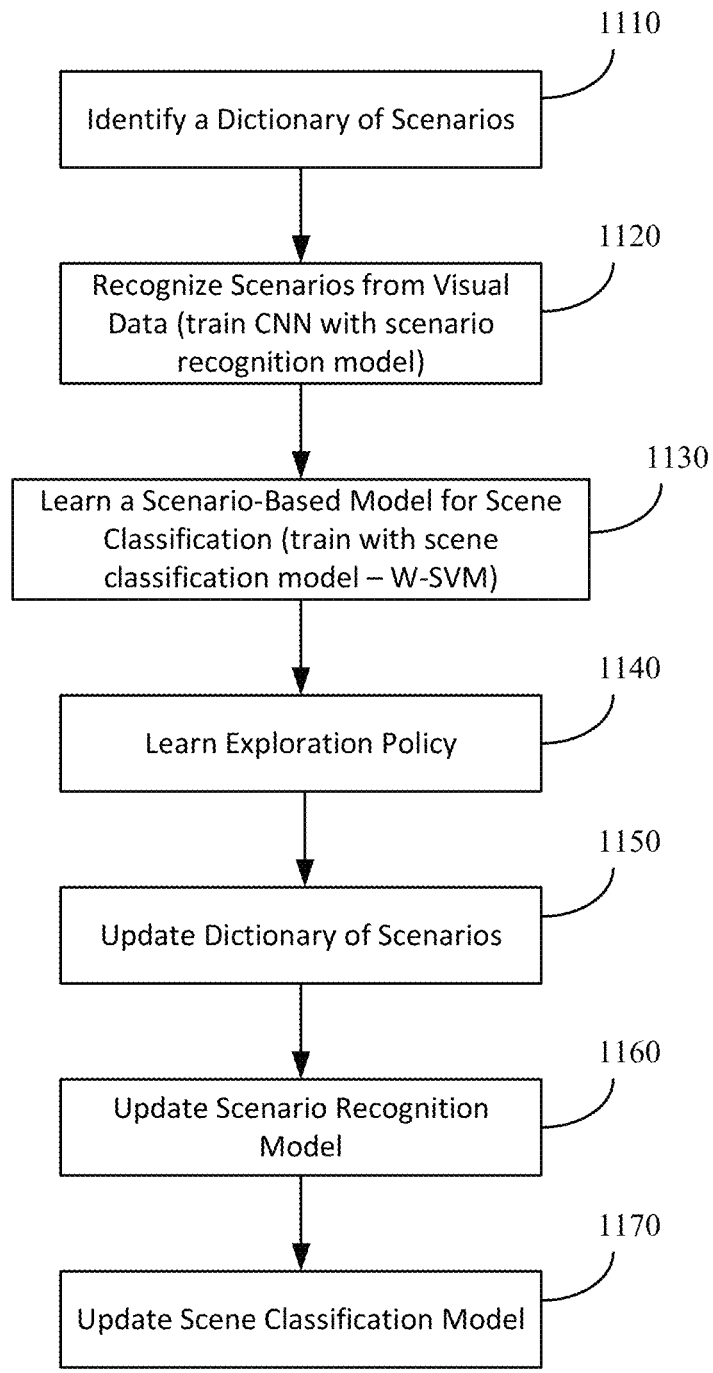
FIG. 11 shows a conceptual diagram for a Dynamic Data-Driven Application System such as described herein.

FIG. 11 shows a conceptual diagram for a Dynamic Data-Driven Application System such as described herein. Referring to FIG. 11, a DDDAS can be implemented by learning to Identify (1110) a Dictionary of Scenarios, training (1120) a CNN with a scenario recognition model, training (1130) a model for scene classification, learning (1140) an exploration policy, updating (1150) the Dictionary of Scenarios, updating (1160) the scenario recognition model, and updating (1170) the scene classification model. This process is reflected in the description of the method of FIG. 9 as well as aspects of the example implementation of the image processing neural network of FIG. 2.

In some cases, identifying (1110) the Dictionary of Scenarios can be accomplished by defining a set of atomic concepts that describe human-understandable properties about scenes. For general indoor scenes, objects are a useful representation. For example, by knowing a scene contains a toilet and shower, it can be hypothesized with high confidence that the scene is a bathroom. Several problems exist with using objects as interpretable features. The space of all possible objects is very large, and many objects appear very rarely. The same type of object can vary widely in appearance based on materials, deformations, and environmental factors such as illumination and viewpoint. These factors make it difficult to learn data-driven models that can accurately detect the presence of individual objects in scene images with high accuracy. Instead of using individual objects as semantic features, "scenarios" are used to capture groups of objects that co-occur (or have some other relationship) under some context. For example, instead of individually detecting mice, keyboards, and computer monitors in images, the recognition algorithms are directed to recognize the group {keyboard, computer monitor, mouse}, which provides less fine-grained but still useful information.

Results of Tests

Experiments were conducted on the SUNRGBD [see S. Song, S. P. Lichtenberg, and J. Xiao, "Sun rgb-d: A rgb-d scene understanding benchmark suite," in *Proceedings of the IEEE conference on computer vision and pattern recognition*, 2015, pp. 567-576], ADE2OK [see B. Zhou, H. Zhao, X. Puig, S. Fidler, A. Barriuso, and A. Torralba, "Scene parsing through ade20k dataset," in *Proc. CVPR*, 2017], and MIT 67 Indoor Scenes [see A. Quattoni and A. Torralba, "Recognizing indoor scenes," in *Computer Vision and Pattern Recognition*, 2009. CVPR 2009. *IEEE Conference on*, 2009: IEEE, pp. 413-420] datasets. Each dataset was divided into separate training and test sets using the recommended splits for the SUNRGBD and MIT67 datasets and a random split for the ADE20K dataset. For each dataset, only the objects that appear in at least 1% of the training instances were considered, resulting in 55 objects for SUNRGBD, 193 for ADE20K, and 166 for MIT67. Random cropping and horizontal mirroring were used to augment the training examples. For the SUNRGBD dataset, the 15 most frequently occurring scene classes were used, reserving 100 samples per class for test data, and generating 1000 samples per class for the training data. For the ADE20K dataset, the 31 most frequently occurring scene classes were used, reserving 25 samples per class for test data, and generating 500 samples per class for training data. For the MIT67 dataset, 67 scene classes were used, reserving 20 samples per class for test data, and generating 800 samples per class for training data. 25 scenarios were learned for SUNRGBD, 70 for ADE20K, and 70 for MIT67. VGG-16 was used as the base CNN architecture of "ScenarioNet" (e.g., system 200), replacing the final fully-connected layers with the scenario block. For the MIT dataset, object annotation data is available for about one-fifth of the training data, the amount of annotated data is very imbalanced between classes, and the annotations are much noisier than for the other datasets. These properties make learning scenarios on the MIT dataset much more difficult than for the other datasets, but it is still possible to achieve relatively good results. For this dataset, the scenarios were learned using the annotated portion of the dataset and a scene classifier was trained on top of these scenarios for the full dataset.

PBMF is a lossy factorization. To determine how much information about object presence is lost as a result of the decomposition, experiments were conducted. For this experiment, perfect, ground-truth knowledge is assumed of the object presences. Three cases of PBMF were considered: PBMF-Basic (Eq. 2), PBMF-Full (Eq. 3) with uniform weighting, and PBMF-Full using the proposed weight matrix. The results were compared to the SVD, NNSVD [see C. Ding, T. Li, W. Peng, and H. Park, "Orthogonal nonnegative matrix t-factorizations for clustering," in *Proceedings of the 12th ACM SIGKDD international conference on Knowledge discovery and data mining*, 2006, pp. 126-135], NMF [see P. Paatero and U. Tapper, "Positive matrix factorization: A non-negative factor model with optimal utilization of error estimates of data values," *Environmetrics*, vol. 5, no. 2, pp. 111-126, 1994], Greedy Boolean MF [see P. Miettinen, T. Mielikainen, A. Gionis, G. Das, and H. Mannila, "The discrete basis problem," *IEEE transactions on knowledge and data engineering*, vol. 20, no. 10, pp. 1348-1362, 2008], and Binary MF [see Z. Zhang, T. Li, C. Ding, and X. Zhang, "Binary matrix factorization with applications," in *Seventh IEEE International Conference on Data Mining (ICDM* 2007), 2007: IEEE, pp. 391-400] as well as all-zeros and all-mean values baselines. The basis and encoding matrices were initialized using a procedure similar to [Zhang et al., 2007, above].

Figure 12A:
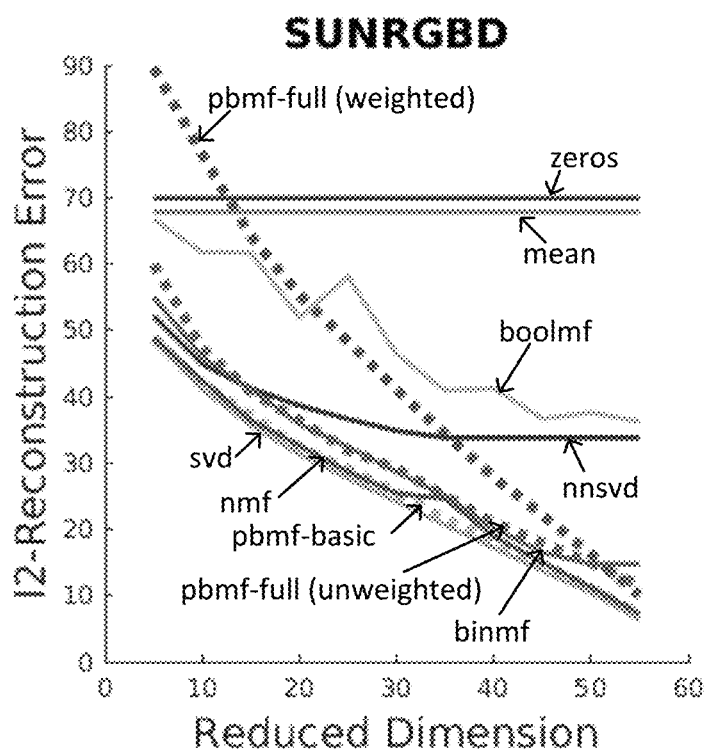
FIGS. 12A-12C show plots of reconstruction error between a recovered and ground-truth matrix as the dimensionality of the reduced representation is varied.
Figure 12B:
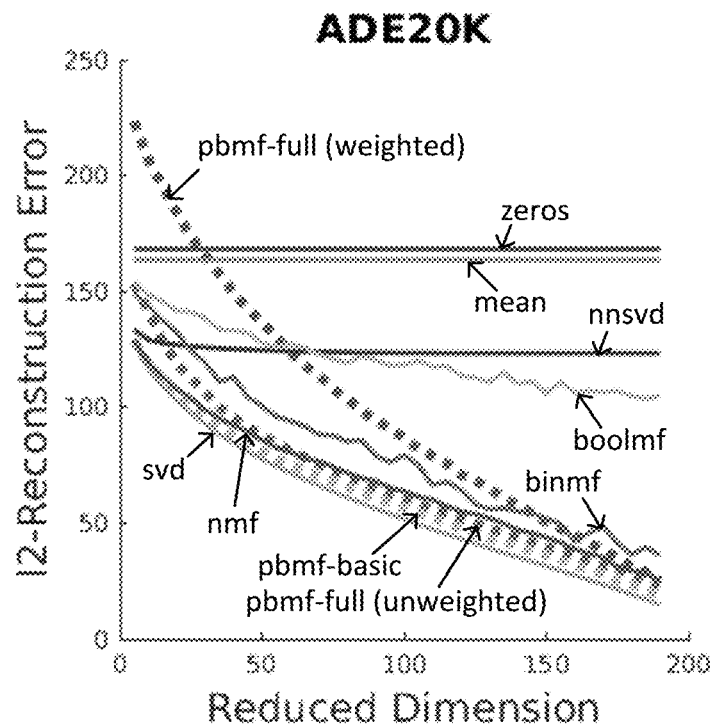
Figure 12C:
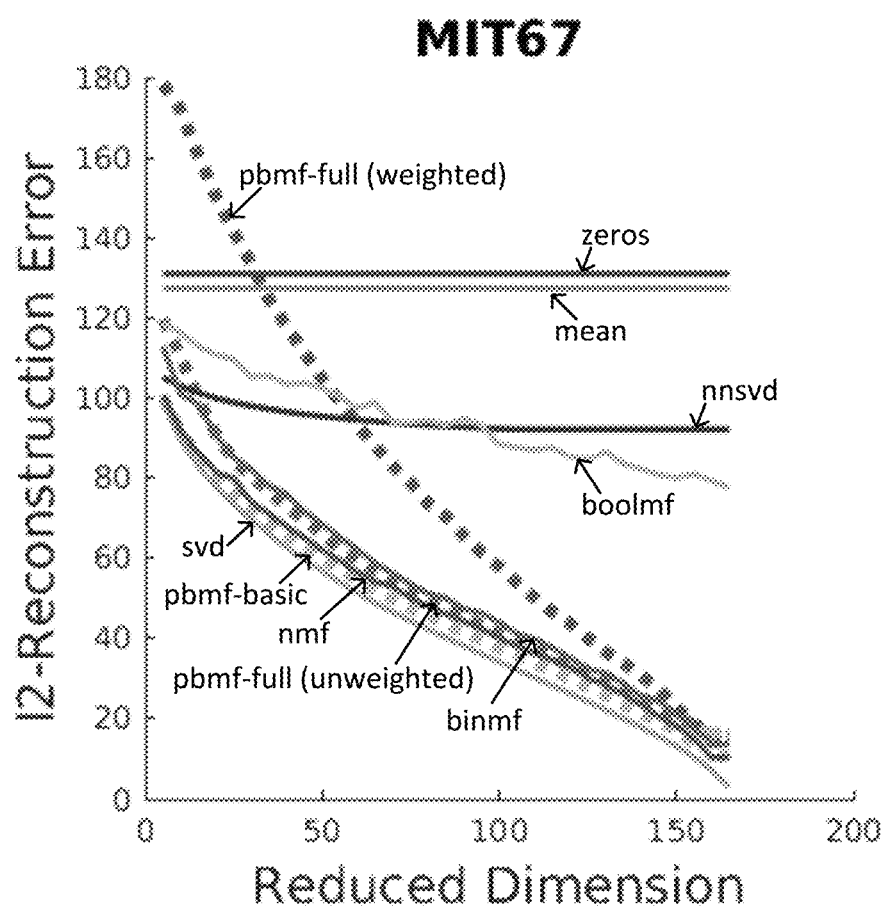

Results are plotted in FIGS. 12A-12C. In particular, FIGS. 12A-12C show plots of reconstruction error between a recovered and ground-truth matrix as the dimensionality of the reduced representation is varied. As can be seen by the plots, PBMF-Basic works exceptionally well for reconstruction, but as additional constraints are added (particularly when the weights of rare objects are increased), the reconstruction worsens. However, the reconstruction error remains tolerable, especially for reasonable numbers of scenarios, so it can be concluded that PBMF is suitable for learning scenarios.

Advantageously, "scenarios" go one step further than simply using pairwise co-occurrence relationships between objects to discover meaningful groups of objects by taking the step of efficiently learning groups of objects of varying size.

Certain existing methods learn tree-structured groupings of objects. However, several issues exist with using a tree structure for specifying scene concepts. To compute explicit scenarios, one must identify where to cut the tree. Additionally, while individual concepts can belong to multiple scene concepts by cutting the tree at different ancestor nodes, it becomes hard to properly place objects in the hierarchy that serve different functions within different groups, e.g. a screen with a keyboard and mouse is different from a screen with a cable box and remote. The subject scenarios address these issues and provide additional information, e.g. how important each object is to a given scenario and how to decompose scene instances into combinations of scenarios. The systems described herein learn explicit scenarios.

There are some methods that can take an image and generate natural language explanations and captions, but the described image processing neural network system generates less sophisticated, yet still human-interpretable semantic descriptions but doesn't require training language models which require large databases of image-caption pairs.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims, and other equivalent features and acts are intended to be within the scope of the claims.

What is claimed is:

1. An image processing neural network system comprising:
   at least one convolutional layer;
   at least one pooling layer; and
   a scenario block layer that performs scene classification and generates a dictionary of scenarios and a vector of scenario encoding coefficients to output a probabilistic scene class assignment and the vector of scenario encoding coefficients, wherein the vector of scenario encoding coefficients corresponds to reasoning for the scene classification, the reasoning for the scene classification comprising information of scenarios, including objects associated with each scenario, supporting the scene classification.

2. The system of claim 1, wherein each scenario in the dictionary of scenarios comprises one or more objects.

3. The system of claim 2, wherein the dictionary of scenarios indicates a set of objects for each scenario.

4. The system of claim 3, wherein at least one same object appears in at least two scenarios.

5. The system of claim 2, wherein at least one of the scenarios in the dictionary of scenarios comprises a set of frequently co-occurring objects.

6. The system of claim 2, wherein at least one of the scenarios in the dictionary of scenarios comprises a set of objects based on affordances.

7. The system of claim 2, wherein at least one of the scenarios in the dictionary of scenarios comprises a set of objects based on interactions.

8. The system of claim 2, wherein at least one of the scenarios in the dictionary of scenarios comprises a set of objects based on temporal relationships.

9. The system of claim 2, wherein at least one of the scenarios in the dictionary of scenarios comprises a set of objects based on spatial relationships.

10. The system of claim 2, wherein at least one of the scenarios in the dictionary of scenarios comprises a set of objects based on causal relationships.

11. The system of claim 1, wherein a scene corresponding to the probabilistic scene class assignment comprises one or more scenarios.

12. The system of claim 1, wherein the scenario block layer comprises:
   a convolution layer;
   a global pooling layer receiving output of the convolution layer;
   a first fully connected layer receiving output of the global pooling layer;
   a sigmoid classifier layer for scenario encoding receiving output of the first fully connected layer;
   a Pseudo-Boolean Matrix Factorization (PBMF) layer receiving output from the sigmoid classifier layer to update the dictionary of scenarios;
   a second fully connected layer receiving the output from the sigmoid classifier layer; and
   a softmax classifier layer for scene prediction receiving the output of the second fully connected layer.

13. The system of claim 1, wherein the scenario block layer comprises:
   a convolution layer;
   a global pooling layer receiving output of the convolution layer;
   a first fully connected layer receiving output of the global pooling layer;
   a sigmoid classifier layer for scenario and topic encoding receiving output of the first fully connected layer;
   a Pseudo-Boolean Matrix Factorization (PBMF) layer receiving output from the sigmoid classifier layer to update the dictionary of scenarios;
   a second fully connected layer receiving the output from the sigmoid classifier layer;
   a rectified linear layer receiving output from the second fully connected layer;
   a third fully connected layer receiving output from the rectified linear layer; and a sigmoid classifier layer for scene prediction receiving the output of the third fully connected layer.

14. The system of claim 1, wherein the image processing neural network system is coupled to one or more sensors of an autonomous vehicle.

15. The system of claim 1, wherein the image processing neural network system is coupled to one or more sensors of a robot.

16. A method of image classification with scene understanding, comprising:
receiving an image at an image processing neural network system;
processing the image using the image processing neural network system to determine a scene assignment and a confidence score for the scene assignment and generate a dictionary of scenarios and a vector of scenario encoding coefficients;
identifying scenarios associated with the scene assignment using the vector of scenario encoding coefficients for the image and the dictionary of scenarios; and
outputting the scene assignment and the confidence score along with scenarios identified from the vector of scenario encoding coefficients such that both the scene assignment and information of scenarios, including objects associated with each scenario, supporting the scene assignment are output.

17. The method of claim 16, further comprising:
determining whether to output a final prediction for the scene assignment using the confidence score for the scene assignment,
when the confidence score does not satisfy a criterion for sufficient confidence for predicting the scene assignment, determining whether a scene of the image is a new unseen type of scene, and
when the scene of the image is not determined to be the new unseen type of scene, sending a signal to capture a new image from a different view.

18. The method of claim 17, where, when the scene of the image is determined to be the new unseen type of scene, the method further comprises:
querying a human to collect new data; and
updating a model used by the image processing neural network system using the new data.

19. A storage medium having an application stored thereon, that when executed by a computing system directs the computing system to:
provide at least one input image to an image processing neural network system;
receive a probabilistic scene class assignment and a vector of scenario encoding coefficients from the image processing neural network system; and
provide a reasoning for a scene classification of the probabilistic scene class assignment using the vector of scenario encoding coefficients as output such that both the probabilistic scene class assignment and information of scenarios, including objects associated with each scenario, supporting the probabilistic scene class assignment are output.

20. The storage medium of claim 19, wherein the application further directs the computing system to:
receive at least one query regarding similarity or differences between images; and
output a result of the at least one query using at least the vector of scenario encoding coefficients.

* * * * *